Dec. 12, 1944.　　　E. O. ROGGENSTEIN　　　2,364,758
RECORDING AND COMPUTING MACHINE
Filed Oct. 25, 1938　　　12 Sheets-Sheet 1

FIG.I.

INVENTOR
E.O.ROGGENSTEIN
BY *H.A. Sparks*
ATTORNEY

Dec. 12, 1944.  E. O. ROGGENSTEIN  2,364,758
RECORDING AND COMPUTING MACHINE
Filed Oct. 25, 1938  12 Sheets-Sheet 2

FIG.2.

INVENTOR
E. O. ROGGENSTEIN
BY *M. A. Sparks*
ATTORNEY

Dec. 12, 1944.   E. O. ROGGENSTEIN   2,364,758
RECORDING AND COMPUTING MACHINE
Filed Oct. 25, 1938   12 Sheets-Sheet 3
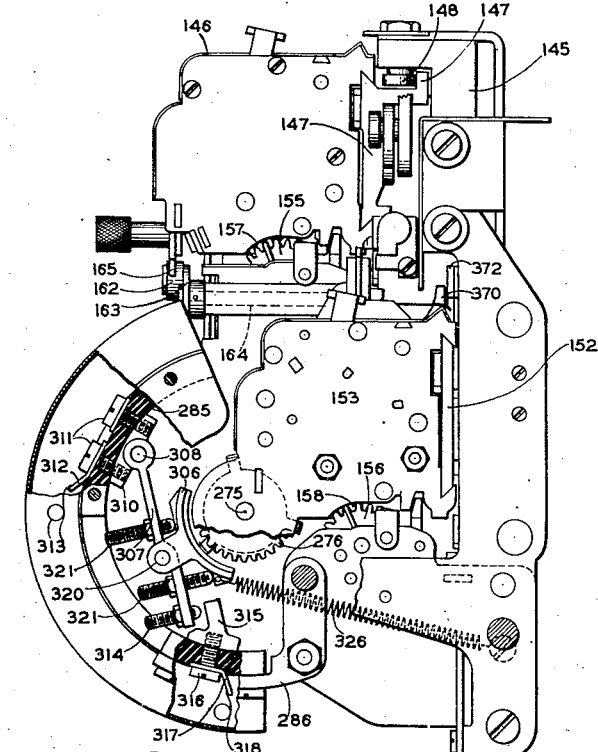
FIG.3.
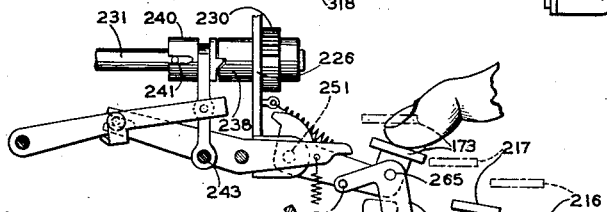
FIG.4.
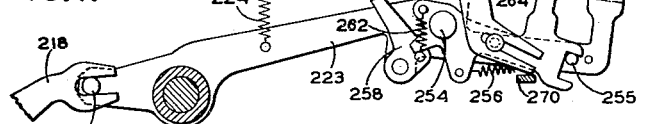
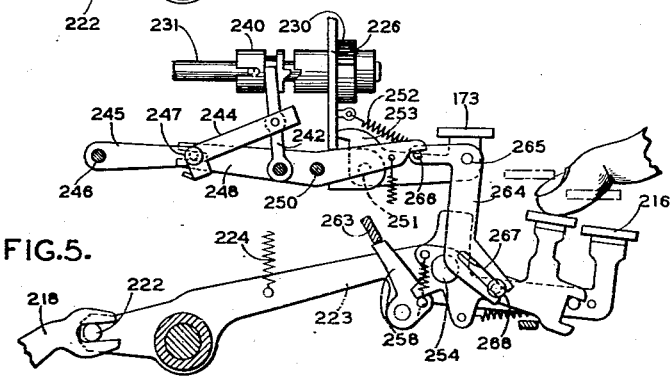
FIG.5.
INVENTOR
E. O. ROGGENSTEIN
BY *H. A. Sparks*
ATTORNEY Dec. 12, 1944.   E. O. ROGGENSTEIN   2,364,758
RECORDING AND COMPUTING MACHINE
Filed Oct. 25, 1938   12 Sheets-Sheet 4
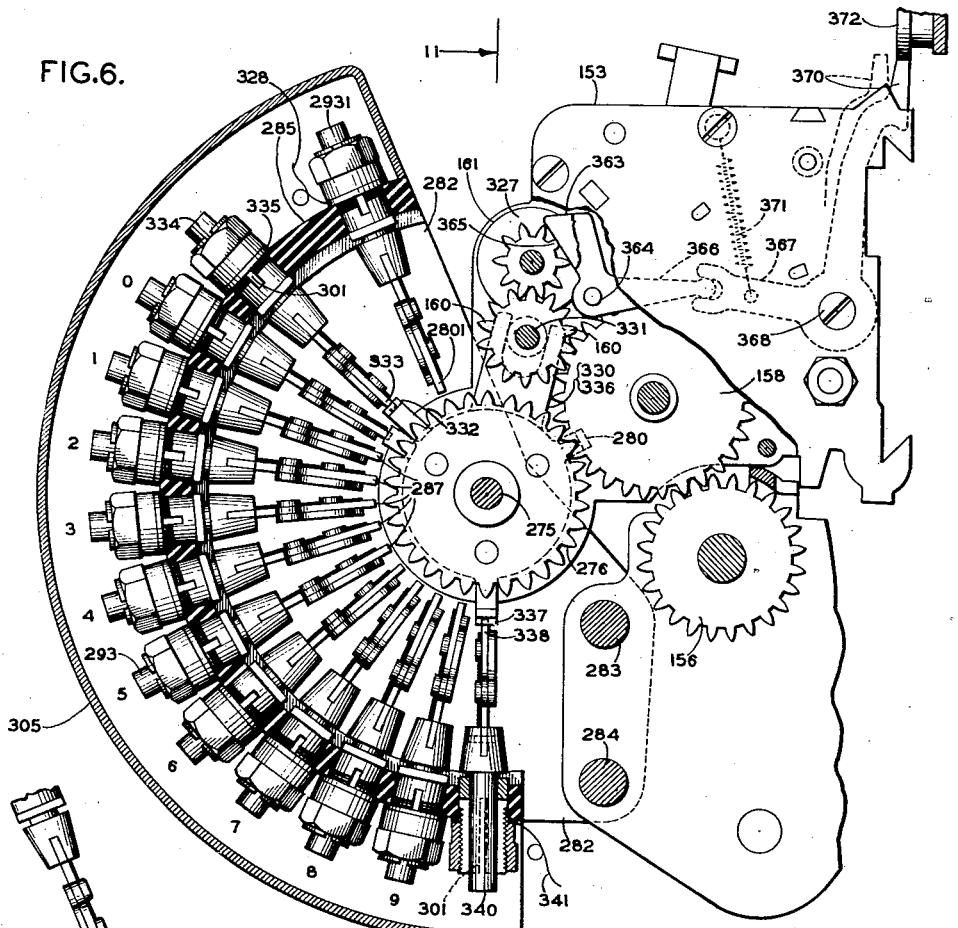
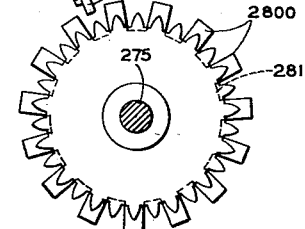
FIG.7.
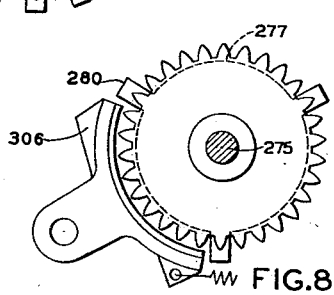
FIG.8.
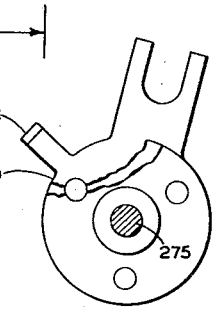
FIG.9.
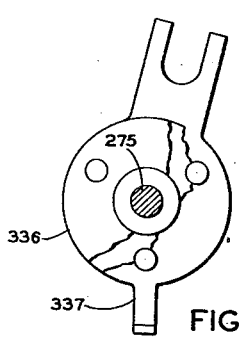
FIG.10.
INVENTOR
E. O. ROGGENSTEIN
BY *N. A. Sparks*
ATTORNEY Dec. 12, 1944.   E. O. ROGGENSTEIN   2,364,758
RECORDING AND COMPUTING MACHINE
Filed Oct. 25, 1938   12 Sheets-Sheet 5

INVENTOR
E. O. ROGGENSTEIN
BY *H. G. Sparks*
ATTORNEY

Dec. 12, 1944.  E. O. ROGGENSTEIN  2,364,758
RECORDING AND COMPUTING MACHINE
Filed Oct. 25, 1938  12 Sheets-Sheet 6
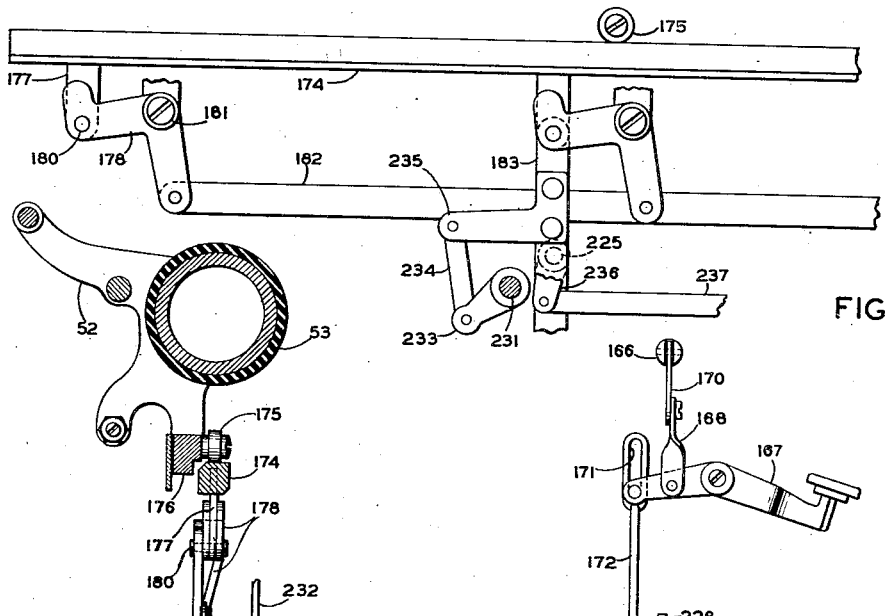
FIG.13.
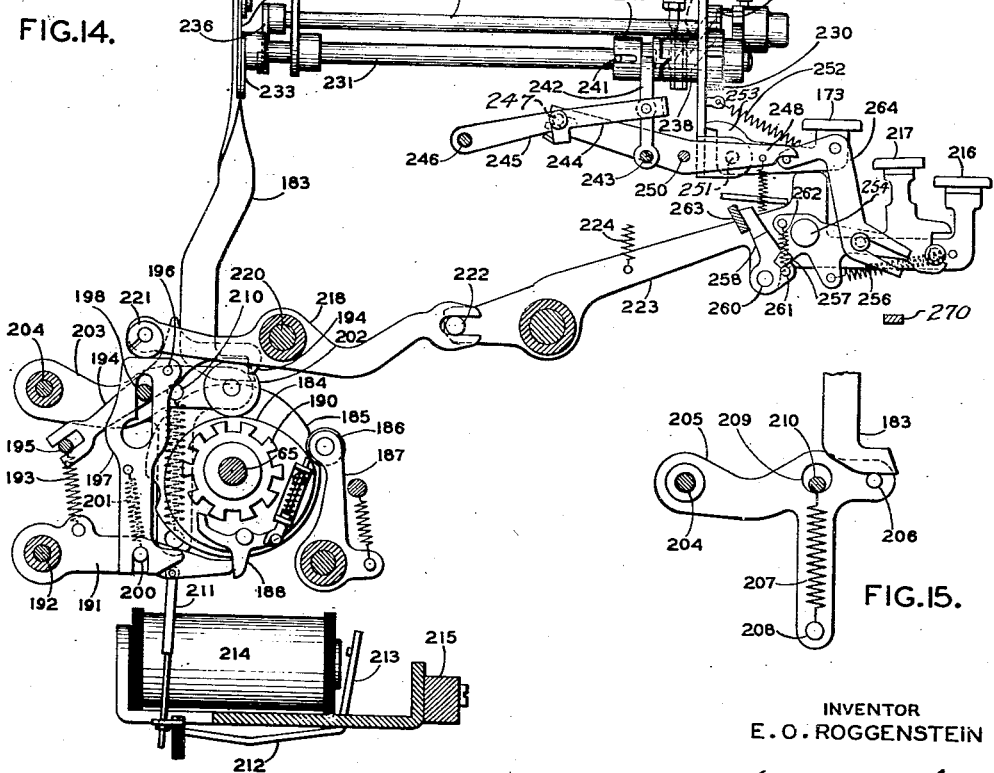
FIG.14.
FIG.15.
INVENTOR
E. O. ROGGENSTEIN
BY *W. A. Sparks*
ATTORNEY Dec. 12, 1944. E. O. ROGGENSTEIN 2,364,758
RECORDING AND COMPUTING MACHINE
Filed Oct. 25, 1938 12 Sheets-Sheet 7
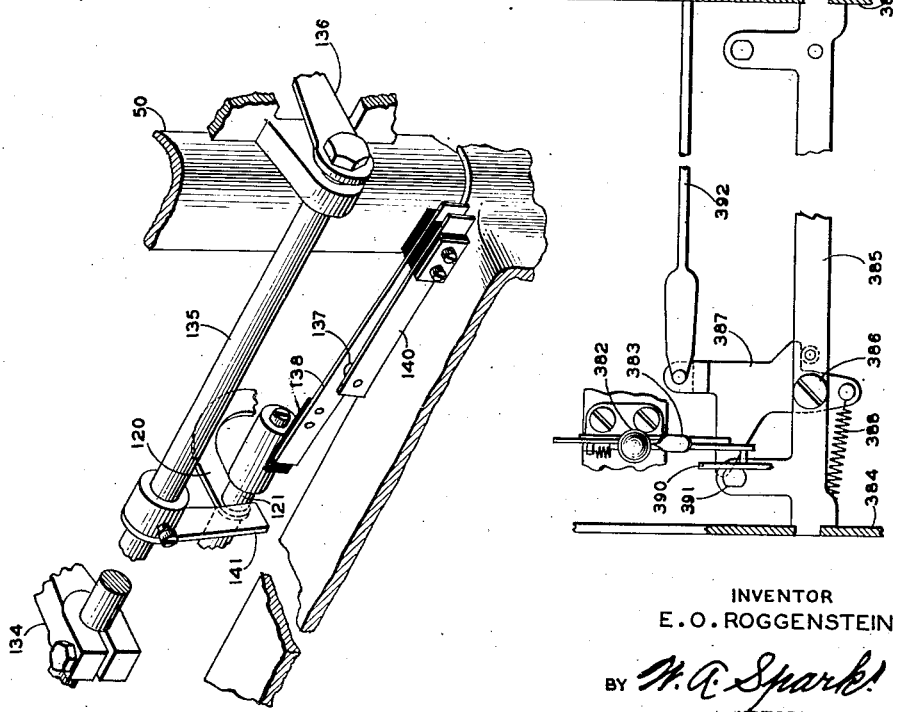
INVENTOR
E. O. ROGGENSTEIN
BY W. A. Spark
ATTORNEY Dec. 12, 1944.  E. O. ROGGENSTEIN  2,364,758
RECORDING AND COMPUTING MACHINE
Filed Oct. 25, 1938  12 Sheets-Sheet 8

INVENTOR
E. O. ROGGENSTEIN
BY *F. A. Sparks*
ATTORNEY

Dec. 12, 1944.  E. O. ROGGENSTEIN  2,364,758
RECORDING AND COMPUTING MACHINE
Filed Oct. 25, 1938  12 Sheets-Sheet 9

INVENTOR
E. O. ROGGENSTEIN
BY W. A. Sparks
ATTORNEY

Dec. 12, 1944.  E. O. ROGGENSTEIN  2,364,758
RECORDING AND COMPUTING MACHINE
Filed Oct. 25, 1938   12 Sheets-Sheet 10

INVENTOR
E. O. ROGGENSTEIN
BY *H. A. Sparks*
ATTORNEY

Dec. 12, 1944.   E. O. ROGGENSTEIN   2,364,758
RECORDING AND COMPUTING MACHINE
Filed Oct. 25, 1938   12 Sheets-Sheet 11

INVENTOR
E. O. ROGGENSTEIN
BY W. A. Sparks
ATTORNEY

Patented Dec. 12, 1944

2,364,758

UNITED STATES PATENT OFFICE 2,364,758

RECORDING AND COMPUTING MACHINE

Edwin O. Roggenstein, Ilion, N. Y., assignor to Remington Rand Inc., Buffalo, N. Y., a corporation of Delaware Application October 25, 1938, Serial No. 236,854

19 Claims. (Cl. 235—59)

This invention relates to recording and computing machines, and its object generally stated, is to provide improved means for recording one digit at a time, typewriter fashion, the totals registered on a totalizer. The more immediate and specific object of the invention, in the form herein described, is to provide improved means for enabling an ordinary power-operated combined typewriting and computing machine, such for example as the electrified Remington bookkeeping machine, to print its own totals by the usual typewriting mechanism automatically, with little or no intervention by the operator of the machine.

Automatically operating apparatus for causing a typewriting and computing machine to print its own totals, are known, but some of them have imperfections to cure which is an object of this invention, and they have limitations which it is proposed to extend. One object of the invention is to provide various improvements in electrical circuits for accomplishing the purpose specified. Another object is to provide improved means for sensing the totalizer wheels as to the digits registered by them. Another object is to render the apparatus more reliable and certain in its operation. Various other objects will be apparent from the specification and claims.

To the above ends, the invention consists in certain devices and combinations and arrangements of devices both mechanical and electrical and in certain features of construction, all of which will be described herein and pointed out in the claims.

The controls for causing the machine to record its own totals are preferably electrical and they are so shown in the present instance; but some of the features of the invention are also applicable to mechanical apparatus. The invention includes improved means for sensing the wheels of the totalizer, which act rapidly and are reliable in their operation. It also includes improved means for sensing the state of the totalizer as to the sign of the total, and highly efficient and quick acting means for shifting the circuit so as to print the true complement of a number registered in the totalizer. This makes it unnecessary to provide fugitive one mechanism in the totalizer.

Machines of the type of the Remington bookkeeping machine are frequently hooked up to a punch to punch records in statistical cards, as described in numerous patents such, for example, as that to Weiland and Russell, No. 1,682,451, dated August 28, 1928, and that to Lasker, Patent 2,124,178, issued July 19, 1938. Obviously such a punch could be connected with the machine herein described, in which event the totals would be automatically recorded, not only by printing them on the typewriter but also by punching them in cards or tapes. The Powers punch described in said patents itself includes digital solenoids to control the punches, a carriage and means for spacing the latter. The present electrical system is, as to many of its features, applicable directly to such a punch. The invention is, therefore, not limited to printing as a recording means.

A patent issued to George G. Going, September 12, 1939, No. 2,172,749, and also a patent issued to Frederick W. Schremp, July 7, 1942, No. 2,288,846, describe and claim certain improvements in automatic total writing apparatus including electric circuits and shown applied to the Remington bookkeeping machine, and said patents may contain claims reading on some feature of the constructions described herein. The present applicant is not the first inventor of anything disclosed in the said patents.

An illustrative instance of the invention is shown in the acocmpanying drawings, in which Fig. 1 is a general front-to-rear vertical sectional view of said machine having the invention embodied therein, the view being on an irregular section with some parts broken away or shown fragmentarily and many parts omitted;

Fig. 2 is a partial front elevation of the machine with certain parts at the top of the figure shown by a mirage effect which parts would really be hidden;

Fig. 3 is a partial right-hand side elevation with parts in section, and showing the totalizers and some of the sensing or selecting mechanism;

Figs. 4 and 5 are views in left-hand side elevation and partly in section showing the shift and credit balance key mechanism in different operated positions;

Fig. 6 is a right-hand view on an enlarged scale partly in section and showing the digit sensing mechanism;

Fig. 7 is a detached view of the extreme left-hand sensing wheel of the totalizer, and a co-operating sensing finger;

Fig. 8 illustrates one of the numeral sensing wheels of the totalizer, and a certain cooperating detector;

Figs. 9 and 10 are views of stationary plates for sensing punctuation points;

Fig. 13 is a fragmentary front view of a portion of the carriage shift mechanism;

Fig. 14 is a general left-hand view of the carriage shift mechanism and the reversing and credit balance mechanism of the machine;

Fig. 15 is a fragmentary illustration of a portion of the mechanism shown in Fig. 14;

Fig. 16 is an isometric view of a certain circuit breaker and means for controlling it;

Fig. 17 is a top plan view in horizontal section of a portion of the mechanism shown in Fig. 18;

Fig. 18 is a front view of the means whereby the circuit is controlled by the clearance-proof mechanism and the disconnect key of the machine;

Figure 23:
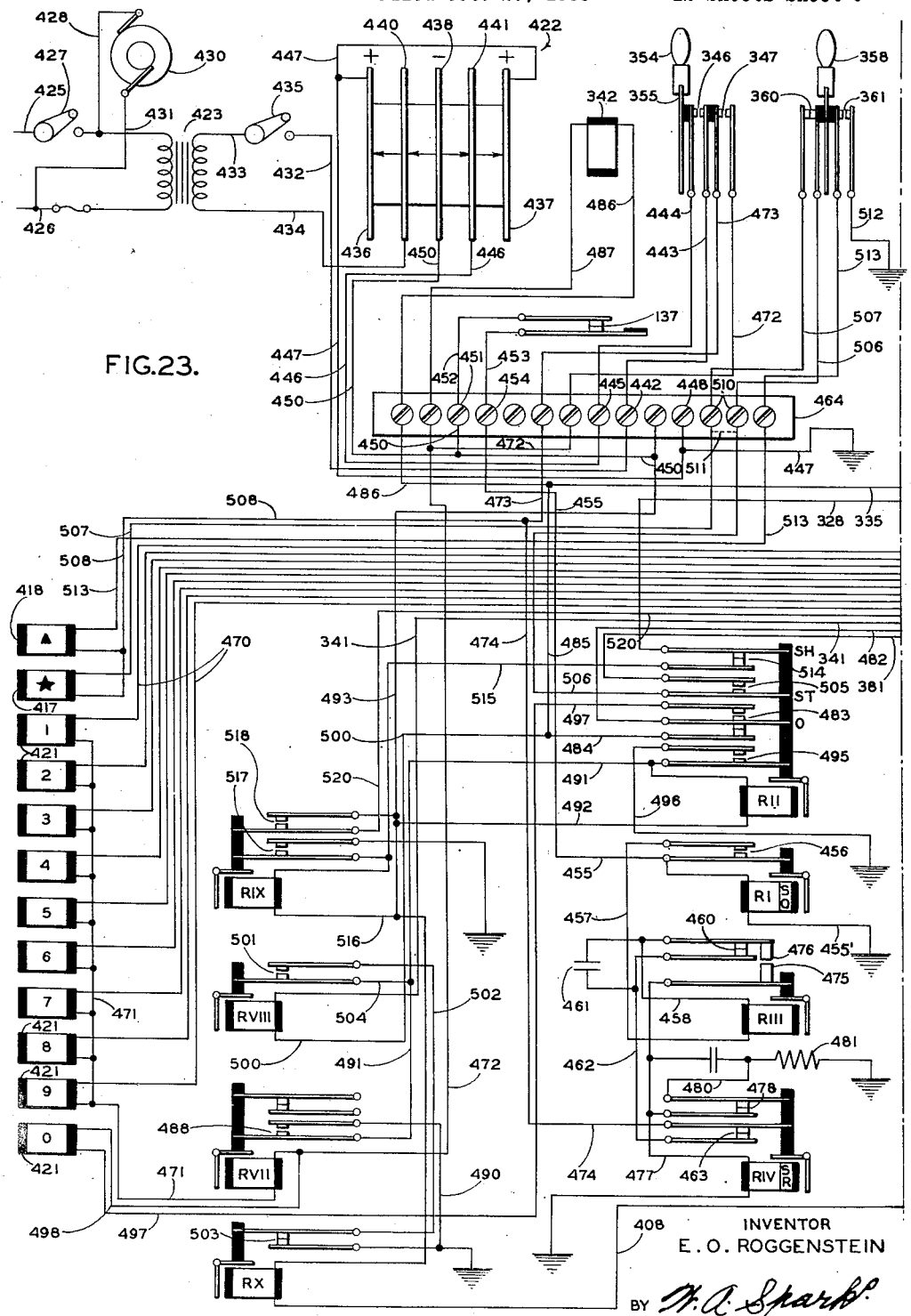
Figure 24:
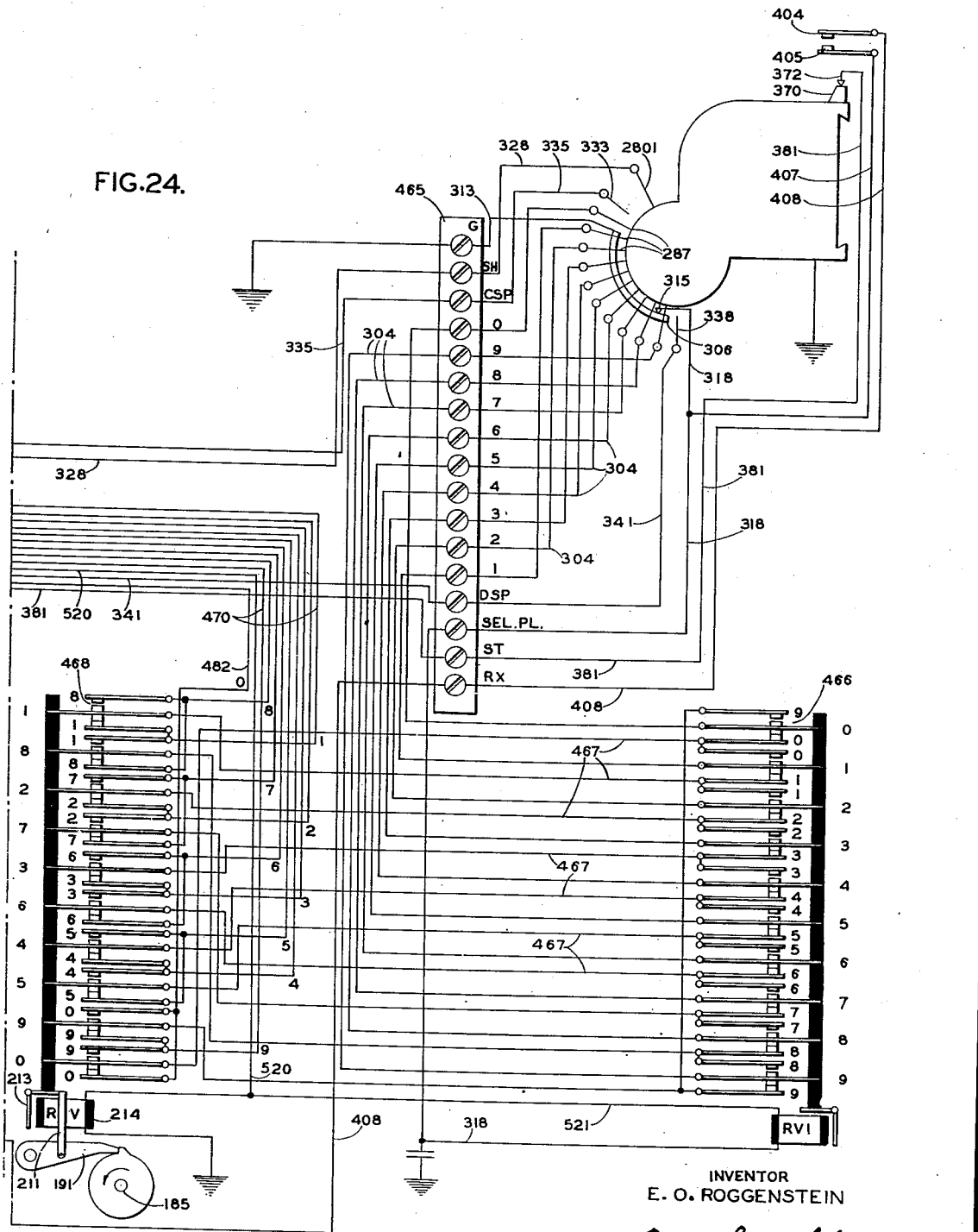
Figure 25:
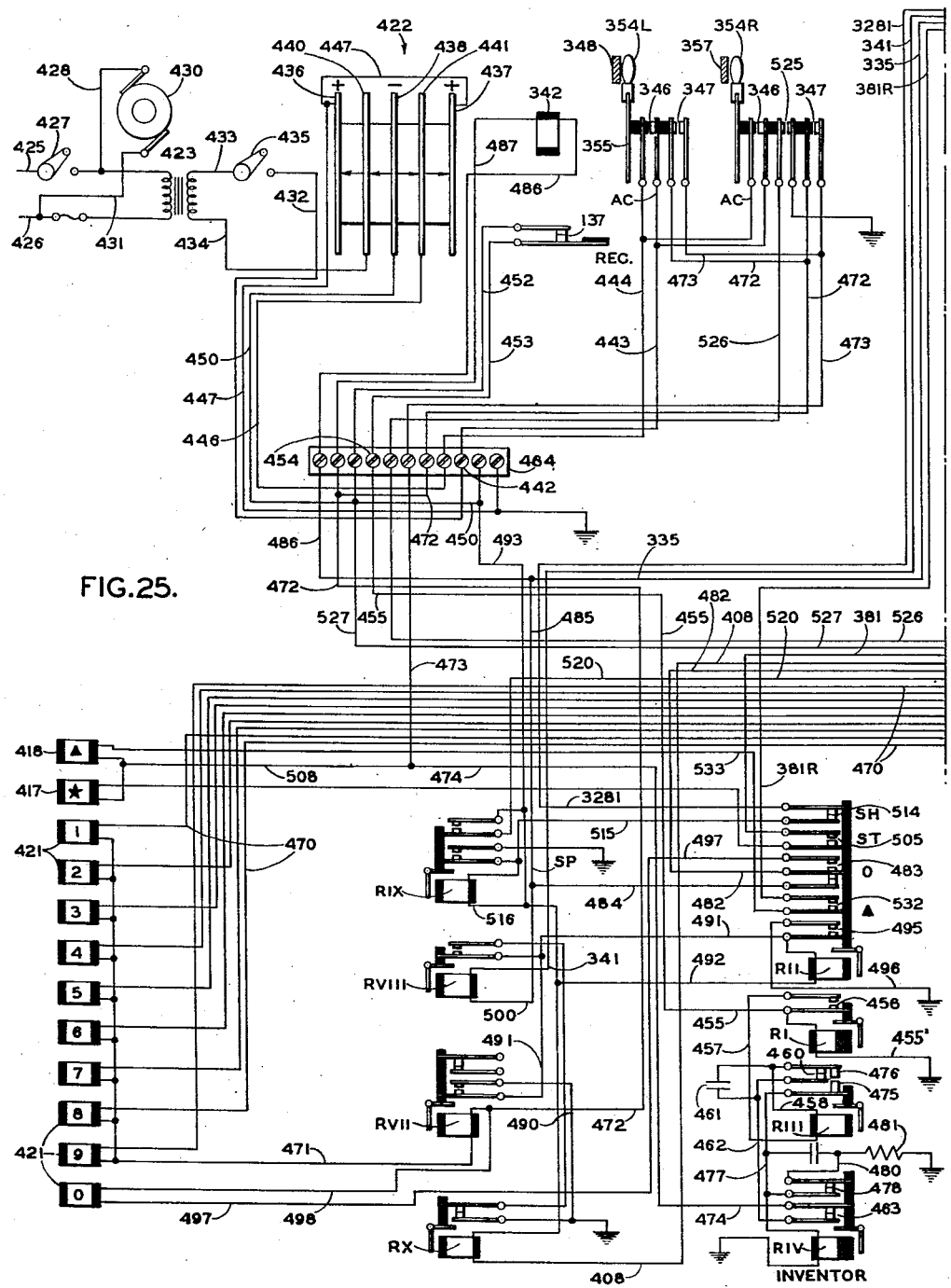
Figure 26:
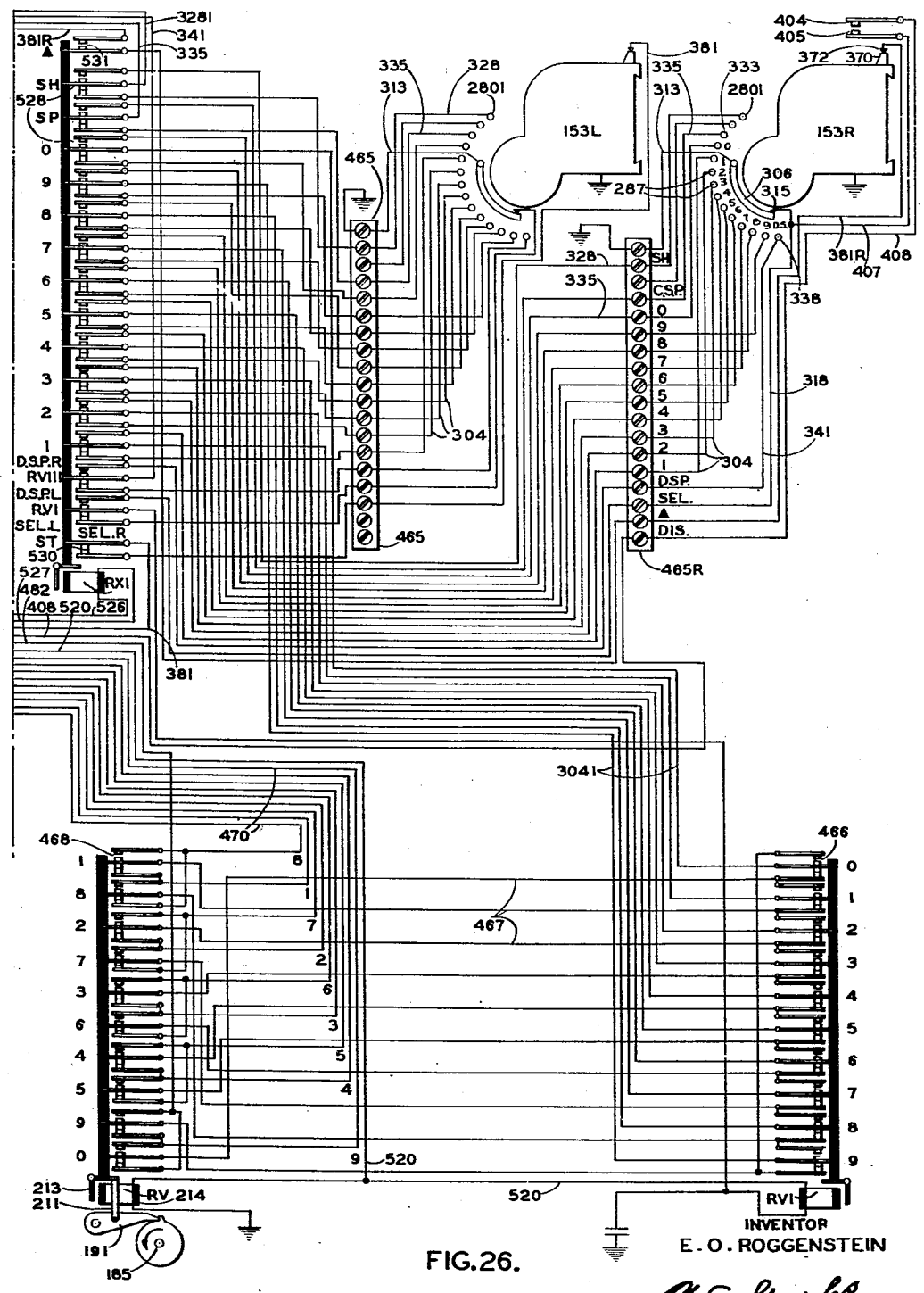

Figs. 23 and 24 together constitute the circuit diagram of the machine for writing the totals from a single cross totalizer;

Figs. 25 and 26 together constitute the circuit diagram of the dual machine in which totals are automatically written from two cross totalizers.

In the drawings the invention is shown applied to an electrified Remington bookkeeping machine. This machine is well known in the art and has been described in a series of patents, and only so much of the machine is shown in the present drawings as is necessary to an understanding of the invention and its application thereto. Said machine includes a Remington typewriter, fragments of whose frame 50 are shown in the drawings.

Figure 1:
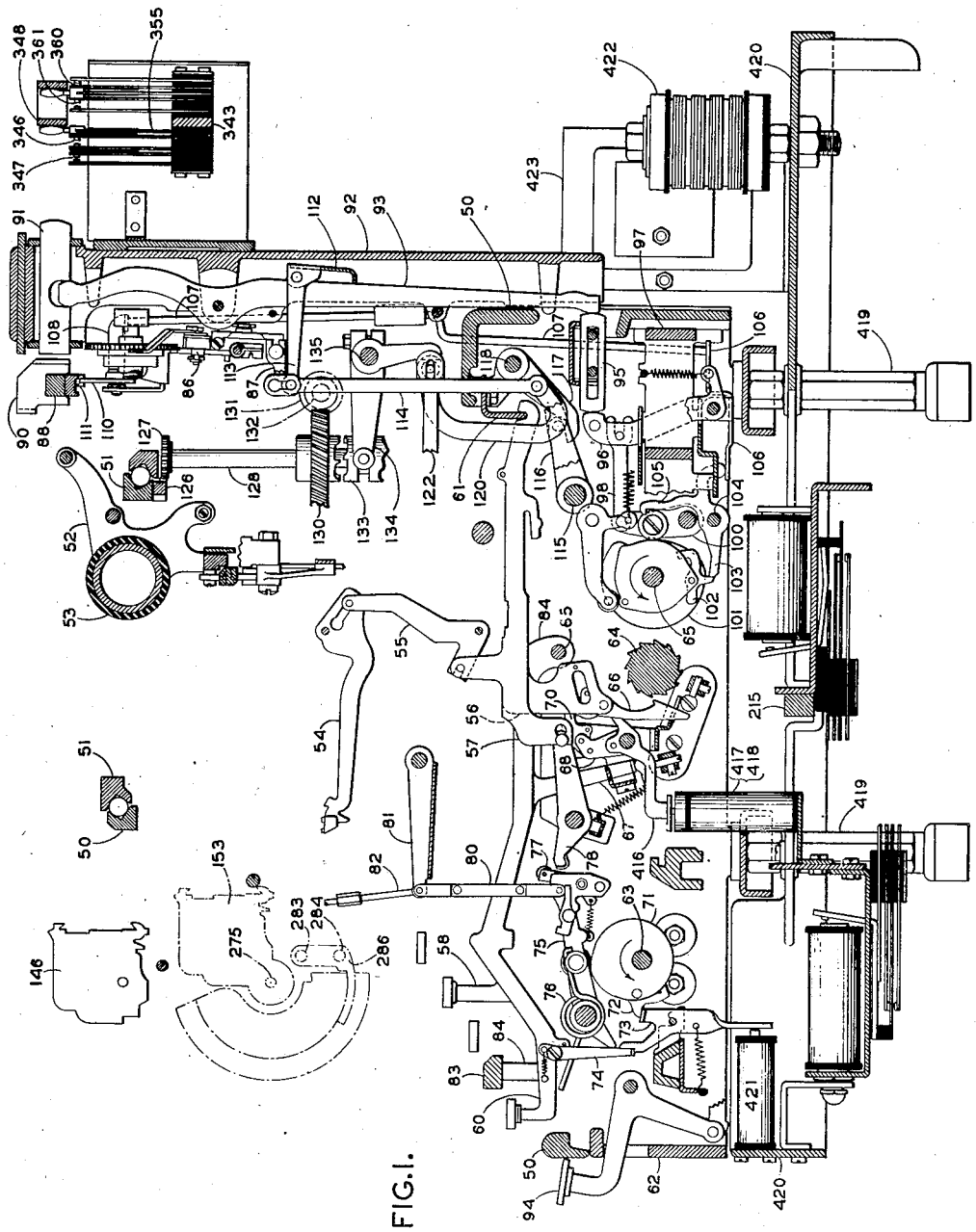

Referring to Fig. 1, the typewriter carriage 51 supports a platen frame 52 carrying a platen 53. The type bars 54 are operated by sub-levers 55. The sub-levers which operate alphabetical type bars are operated by levers 56 and those that operate numerical type bars by levers 57, which, together with the alphabetic key levers 58 and numerical key levers 60 are all pivoted on an angle bar 61 at the rear of the machine. All of these type bars are operated by a power drive located in a base section on the frame 62 in which the typewriter frame is mounted. This power drive includes three continuously rotating shafts, namely, a shaft 63 for operating the computing mechanism and the numeral type bars, a snatch roll 64 for operating the alphabetic and other character type bars, and a third shaft 65 which operates the tabulating, backspacing, and carriage shifting mechanisms. These three shafts are driven counter-clockwise, Fig. 1, by any suitable means, such as a motor, as shown in patent to Dodge et al. 2,064,154, December 15, 1936.

Each of the alphabet type bar operating levers 56 has a hook 66 pivoted thereto and hanging down in front of the snatch roll 64. Each of the alphabet key levers 58 has a depending arm 67, adapted to rock a bell-crank 68 carrying a hook 70 engaging the upper arm of the hook 66 in such fashion that, when the key lever is depressed, the hook 66 is swung into engagement with the snatch roll which depresses the lever 56 and operates the type bar.

On the shaft 63 there is a series of cams 71, one for each numeral key, and said cams are loose on the shaft and each is controlled by a clutch, the dog 72 of which is shown in Fig. 1, said dog adapted for engagement with a toothed wheel fast on the shaft. This dog is controlled by a latch 73 adapted to be tripped by a pusher 74 pivoted to the associated numeral key lever 60 with the result that the dog 72 engages the toothed wheel and drives the cam 71 for a single rotation at the end of which it is arrested by the dog 72 again striking the latch 73. Each cam 71 controls a follower lever 75 urged downward by a strong spring 76. The shape of the cam is such that, when it rotates, this lever moves first downward and then up to its normal position. The lever 75 carries a pivoted pawl member 77, which, when the lever is at the bottom of its stroke, snaps in under the front end of a lever 78, which at its rear end is articulated by pin and slot with one of the levers 57. On the up-stroke of the lever 75, pawl 77 rocks the lever 78, which, in turn, rocks the lever 57 and operates the numeral type bar.

Each lever 75 has pivoted thereto a link 80, which is pivoted to a lever 81, which, in turn, is pivoted to a vertical link 82, which operates the computing mechanism. All of this mechanism is so well known that it is unnecessary to describe it further.

The Remington machine also includes a space bar 83, whose bail arms 84 are fast on a shaft 85, an arm of which is adapted to operate the dog rocker 86 of the typewriter escapement through a link 87. This link is also arranged to be operated by a universal bar which is actuated by the heel of each of the type bars 54. The typewriter also includes a denominational tabulating mechanism. The column stop bar 88 at the rear of the typewriter carriage carries column stop 90 adapted to be arrested by denominational stops 91 mounted in a frame 92 at the rear of the typewriter. These stops 91 are operated by vertical levers 93, which, in the present machine, are or may be operated by power under control of the tabulator keys 94 at the front of the machine. The mechanism for operating most of the denominational stops is not shown herein, but the drawings do show the mechanism for operating one of the stops 91 automatically by the travel of the typewriter carriage. This particular stop is operated by one of the levers 93, which, like the other such levers, is operated by a slide 95, which, in turn, is operated by a vertical lever 96 pivoted in a special tabulator frame 97. This mechanism is substantially the same as that described in the patent to Dodge et al. above mentioned, and it will, therefore, be unnecessary to describe it further. Lever 96 is operated by a link 98 pivoted on the follower lever 100 of a cam 101 which is loose on the drive shaft 65 and operated by a clutch comprising a toothed wheel fast on said shaft and engageable by a dog 102. This dog is normally held out of engagement by a compound latch 103 in the form of a three-armed lever pivoted at 104, the horizontal arm of this lever normally holding the cam in the position shown in Fig. 1. When this lever is rocked counterclockwise to release the dog 102 a tooth or hook on the end of the upright arm 105 of this lever moves into the path of the dog 102 and arrests the dog at about the end of a quarter-rotation of the cam, so that the cam stands in that position until the compound dog is rocked back to normal position. When that occurs the dog is released from the latch arm 105 and is, at the end of its complete rotation, arrested in normal position by the arm 103. The outline of the cam 101 is such that, during the first quarter-rotation thereof, it rocks the follower lever 100 toward the rear moving the stop 91 into active position and holding it there until near the end of the complete rotation of the cam. More than half of the outline of this cam is a concentric high part so that the stop 91 is not withdrawn instantly on the release of the dog arm 105, but remains in stopping position until near the end of the rotation of the cam, thus giving the carriage time to settle down from any vibration that may have been caused by its arrest.

The latch or detent 103, 105 is operated by a plate-like lever 106, which lies beneath the rearwardly extending third arm of the latch member. This lever is adapted to be rocked clockwise in order to operate said latch lever by a long rod 107 resting on its rear end and extending upward to a point above the top plate of the typewriter, where its upper end rests under the end of an arm 108 of a device arranged to rock on a transverse horizontal pivotal axis and comprising an upstanding arm 110 adapted to cooperate with a cam bar 111 mounted on the underside of the column stop bar 88 in such manner that it can be set at any desired location lengthwise of said bar. As this automatic tabulating mechanism is fully described in the Dodge et al. patent, and as its detailed construction forms no part of the present invention, it is believed that no further description of it is necessary herein. All of the tabulator levers 93 cooperate with a universal bar 112 lying behind them and having an arm 113 extending horizontally forward therefrom, said arm connected by a link 114 with an arm fast on a rock-shaft 115 in the base of the typewriter. The construction is such that, when any tabulator stop is operated, this universal bar is rocked counter-clockwise and rocks the shaft 115 clockwise. This shaft has an arm 116 adapted to operate an arm 117 fast on a second rock-shaft 118 so as to rock the latter counter-clockwise. Said shaft 118 has fast thereon an arm 120, the upper end of which (Fig. 16) carries a cross piece or stud 121 which (Fig. 1) is connected by a pin and slot with a long link 122, which operates a certain lock, which in the Remington machine is called the ball lock, at the front of the machine, so as to lock all numeral keys and certain other devices whenever the tabulator is in operation.

The typewriting machine includes a power driven carriage return mechanism. A rack 126 is mounted on the under side of the rear rail of the carriage 51 and meshes with a pinion 127 on the upper end of a vertical shaft 128, on which a worm wheel 130 is loosely journaled. This worm wheel is driven by a worm 131 on a shaft 132 driven by a belt at the right-hand side of the machine.

The said worm wheel 130 carries the driving element of a clutch, the driven element of which is a sleeve 133 slidably splined on the shaft 128 and controlled by an arm 134 fast on a rock-shaft 135, which at its left-hand end (Fig. 16) is controlled through an arm 136 by a mechanism not shown herein, but which is well known in the art. This mechanism may be so set that, at the end of a line of writing, the arm 136 is automatically moved upward by a spring, throwing the clutch members into engagement, and at the end of the return motion of the carriage, is automatically pulled down and latched down by means controlled by the carriage. This mechanism is not further described because it bears on the present invention only in the respect that it opens a pair of contacts to break an electric circuit during the time when the carriage is being returned. These contacts 137 are shown in Fig. 16 as mounted respectively on two blades 138 and 140 fastened to the rear left-hand corner post of the typewriter, and bearing against the cross stud 121 hereinbefore referred to as being swung toward the front of the machine whenever the tabulator is in operation. The shaft 135 has fast thereon a depending arm 141, which also moves this same cross stud forward during the time when the carriage return mechanism is in operation. In its normal position, this stud holds the contacts closed, but they spring open whenever said stud is moved toward the front of the machine either by the tabulator or by the carriage return mechanism.

Except as hereinafter described, the computing mechanism is of the sort that has long been used in the Remington machine and which is described in a line of patents, which in a way may be said to begin with that to Wahl 1,270,471, dated June 25, 1918. The differential and control mechanism of this computer is mostly mounted on a casting 145 (Figs. 2 and 3), which casting is secured to the front of the top plate of the typewriter. Vertical totalizers or "dummies" 146 may be mounted at whatever points desired on a main truck 147, guided at the middle of the machine by certain rollers 148 (Fig. 3) and connected with the typewriter carriage 51 by means of certain arms 150 having pin-and-slot connections with brackets 151 at the ends of the truck. The machine also includes cross footing mechanism including a cross truck 152 carrying a cross totalizer 153 and picked up by the vertical totalizers 146, one after another through the intermediary of a pick-up beam 154. At the end of each computing column the cross truck is freed from the vertical totalizer and is drawn back by a spring to its initial right-hand position.

The links 82 (Fig. 1) operate the usual "fan" segments and goose-neck cams, which rock a differential shaft 79 (Fig. 2) and operate the vertical master wheel 155 (Fig. 3) and a cross master wheel 156 to rotate the "carrier" gear wheels 157 and 158 of the vertical and cross totalizers respectively. Motion of these gear wheels is transmitted by idler gears 160 (Fig. 6) to dials 161. The transfer mechanism, etc., are all of the usual kind. The vertical master wheel is reversible for subtraction by means of the usual hand lever not shown. The cross master wheel is reversible for subtraction by the usual means including a follower roller 162 (Figs. 2 and 3) mounted on an arm 163 fast on a rock-shaft 164 and operating the reversing mechanism. The follower roller 162 is under the control of cams 165 (Figs. 2 and 3), one on each of the vertical totalizers 146, and each cam is settable to an upper position where it does not depress the roller 162 but leaves the cross master wheel set for addition, as in the left-hand one of the four totalizers shown in Fig. 2, or to an intermediate position as in the third totalizer shown, where is disconnects the cross master wheel leaving it inoperative, or to a lowest position shown on the second and fourth totalizers where it depresses the roller 162 to its full extent and sets the cross master wheel to subtraction.

Both master wheels can be reversed simultaneously each irrespective of whether it was before set for addition or for subtraction, by the mechanism usual in this machine, and which includes (Fig. 14) a rod or bar 166 mounted in the rear of the actuator mechanism and normally occupying its left-hand position. When this rod is slid to its right-hand position, it reverses both master wheels. This can be done by means of a so-called correction key lever 167, which, when depressed, pushes upward on a link 168, which operates the left-hand arm of a bell-crank 170, whose upper arm pushes the rod 166 toward the right. The key lever 167 has at its rear end a pin that can play in a slot 171 in a vertical link 172, which can be pushed upward under the control of a key 173 which is usually called a credit balance key although that term is inapt as applied to the present invention. In the present machine, the actual raising of this link 172 is effected by the case shift mechanism, which at the same time imparts an upward case shift movement to the platen 53 so as to print negative numbers with a distinctive form of type. Mechanism similar to that employed in the present machine has been in use in the Remington machine heretofore, but, as this mechanism has been modified somewhat for the purposes of the present invention, it will be described in some detail.

The power-operated case shift mechanism (Figs. 13, 14, and 15) includes a rail 174 on which rides a roller or wheel 175 journaled on a stud from the lower cross bar 176 of the platen frame 52. This rail 174 is supported and operated in the manner shown in Fig. 7 of the patent to Hart No. 1,929,064, dated October 3, 1933, which patent describes a power-operated case shift, but not exactly like the one now employed. The rail 174 has several posts 177 by which it is supported, each of said posts playing in a slot in a bell-crank 178 to which the post is pivoted at 180. Each of these bell-cranks is pivoted on a stud 181 supported by the top plate of the typewriter and the downwardly extending arms of all of the bell-cranks are connected by a long transverse link 182 in such a manner that by pulling this link toward the left in Fig. 13, all of the bell-cranks will be rocked clockwise and will elevate the rail 174 and the platen frame. One of the bell-cranks 178 has pivoted thereto at 180 the upper end of a push link 183, which at its lower end is guided for vertical movement by suitable stationary guide plates. The lower end of this link is substantially directly above the power shaft 65 near the left-hand end thereof. Mounted loosely on the shaft 65 is an assembly comprising a cam 184 and a detent cam or disc 185. The latter has a concentric outline interrupted by two notches adapted to be engaged by a roller 186 mounted on a spring-pressed lever 187 so as to retain the disc and with it the cam 184 in either their normal position shown in Fig. 14 or in another position about 180° removed from normal. The cam 184 has pivoted thereto the usual clutch dog 188 adapted for cooperation with the usual toothed wheel 190 fast on the continuously rotating shaft 65. The parts are held in the normal position shown by a latch 191 pivoted on a stationary stud 192 and drawn upward by a spring 193 in position to arrest the dog 188 and force it out of engagement with the wheel 190. A second latch 194 above the cam assembly is adapted to arrest the dog 188 and the cam assembly after about a half-rotation. This latch is in the form of a sort of floating lever having a downwardly and rearwardly extending part forked at its end to embrace a stationary stud 195 on which it can slide. The latch 194 is pivoted at 196 to a coupling member 197 guided for up and down motion by a stationary stud 198 passing through a slot in the coupling member. The lower end of this coupling member is forked to embrace a stud 200 projecting from the lower latch 191 in such fashion that, if the coupling member is pushed downward bringing the upper latch 194 into the path of the dog 188, it will push the lower latch out of engagement and permit the cam to make a half-rotation. When the pressure on the coupling member is released, the parts are drawn by the spring 193 into their normal position shown, releasing the dog 188 from the latch 194 and causing it to be arrested after a half-rotation at normal position by the latch 191. The coupling member 197 is connected with the lower latch 191 by a tension spring 201 so that, if the latch 191 is pulled downward, it tends to draw the latch 194 after it, but the spring can yield momentarily if the upper latch is held at the time.

The cam 184 is adapted to operate a follower roller 202 mounted on the end of an arm 203 pivoted on a stationary stud 204, said roller bearing on the top of the cam. At the right of the arm 203 is another arm 205 (see Fig. 15) substantially parallel therewith, and also pivoted on the stud 204. This arm 205 has a stud 206 on which the foot of the push link 183 rests and by which said link is pushed upward to effect the shift. The arms 203 and 205 are connected by a pair of strong springs 207 one at each side of the piece 205 and each secured at its lower end to a post 208 projecting in both directions from a depending branch of the arm 205 and at its upper end to a stud 210 projecting from the arm 203. Said stud is of such length as to project through a hole 209 in the arm 205 so as to support the two springs one on each side of 205. The hole 209 is larger than the stud 210, so that although the two arms 203 and 205 ordinarily rock together, the former can be forced a little higher when the stops arrest the upward shift of the platen, stretching the springs 207. Except for the spring 201, the case shift mechanism so far described, is the same that has been in use in the Remington machine heretofore.

In the operation of the present invention, the case shift mechanism is brought into use when writing negative totals, by the latch 191 being drawn downward by a link 211 connected with an arm 212 of the armature 213 of an electromagnet 214 mounted on a stationary part 215. When in entering items, it is desired to reverse the normal direction of the operation of the computing mechanism and to print an item in distinctive type, a case shift mechanism is brought into operation by means of the credit balance key 173. Without reversing the computing mechanism it can be brought into operation by means of the case shift key 216 or the shift lock key 217. To these ends a lever 218, pivoted at 220, has on its rear end an adjustable piece 221, which bears on the coupling member 197 so that a counter-clockwise rocking of the lever will depress that member and bring the case shift mechanism into operation. The lever 218 is so rocked by pin-and-slot connection 222 with the key lever 223 on which the case shift key or button 216 is mounted. Said lever 223 has a restoring spring 224.

In the Remington machine the power driven case shift mechanism is also utilized to shift the reversing mechanism of the computer. To this end the usual shaft 225, which at its forward end is journalled in a frame plate 226 and carries the arm 227 to which the link 172 is pivoted (see also Fig. 2) has also at its forward end a small gear sector 228 meshing with another gear sector 230 on an additional shaft 231 lying parallel with the shaft 225 and, like it, journalled in frame plate 226 and in another frame plate 232. This shaft 231 has on its rear end an arm 233, which is connected by a link 234 (Fig. 13) with an arm or bracket 235 secured to the link 183 near the upper end of the latter. The construction is such that, when said link is shifted upward for upper case, it rocks the shaft 231 clockwise in Fig. 13. In Fig. 13 the plate 232 is omitted for clearness. The clockwise rotation of the shaft 231 may be imparted to the sector 230, which will rotate the shaft 225 counter-clockwise and reverse the computing mechanism. Said shaft 225 also has at its rear end an arm 236, which operates a link 237, which extends to the bi-color mechanism of the machine and sets it for printing in red. The sector 230 is loose on the shaft 231, but is connectable with it by means of a clutch, one element of which consists of a notched hub 238 of said sector, and the driving element of which is a toothed sleeve 240 slidable on the shaft 231, but constrained to rotate with it by pin-and-slot connection 241. In the Remington machine as heretofore constructed, this sleeve 240 normally occupies a rear position out of engagement with the other member of the clutch so that a depression of the shift key 216 causes a case shift operation, but does not operate the shaft 225 and the computer reversing mechanism. A linkage is provided, however, of such a sort that, if the credit balance key 173 be depressed, the clutch member 240 will be moved into engagement, and in that event the computing mechanism will be reversed, and the bi-color mechanism set for printing red. If this construction was used in the present machine, the magnet 214 would not reverse the computer. This standard Remington construction has, therefore, been modified so as to reverse the last mentioned mode of operation, that is to say, the clutch 240 is normally in engagement and remains in engagement if the credit balance key 173 is depressed, but is drawn out of engagement if the case shift key 216 is depressed with or without an operation of the shift lock key 217.

The clutch member 240 is controlled by means including an arm 242 pivoted on a stationary pivot 243 and lying in a peripheral groove in said clutch member or sleeve 240. This arm 242 is controlled by a toggle consisting of a link 244 pivoted to the arm 242 and pivoted at its other end to a link 245, which, in turn, is pivoted on a fixed stud 246. This toggle is normally straight or turned a shade upward beyond its dead center, but is adapted to be broken as shown in Fig. 5 by the depression of the shift key 216. The link 244 is preferably made of two layers by folding a long piece of sheet metal back upon itself, and the pivot 247 by which it is connected with the link 245 joins these two layers. Also straddling this pivot between said two layers is a lever 248 having a bifurcated end and a fixed pivot 250, this lever extending out in front of frame plate 226. The credit balance key 173 is pivoted at 251 on a bracket projecting frontward from the plate 226 and it is drawn upward by a fairly strong spring 252, its motion being limited by a heel 253 of the key lever coming against said plate 226.

The shift lock key 217 is of the same construction as heretofore used in the Remington machine. It is pivoted at 254 to the key lever 223, its motion relative to said lever being limited by a stud 255 occupying a fork in the front end of lever 217. Said key is held in its upper position by a spring 256. This key lever has a short arm 257 which controls a locking dog 258 pivoted to the lever 223 at 260, and this lever has a stud 261 which is drawn up against the arm 257 by a spring 262, attached to said stud and to the stud on the lever 217. In the normal position of the lever 217, the latch 258 is held in the position shown in Fig. 14, where it will not engage a sheet metal bracket or stop 263 projecting from the stationary framework. When, however, the lever 223 is depressed by pressure of the finger on the key 217, the latter is rocked about its pivot 254, as shown in Fig. 5, depressing the lever 223 and allowing the locking dog 258 to snap in under the stop 263, so that, when pressure on the key is removed, the lever 223 will be held in its depressed position. The spring 256 tends to restore the lever 217, but is unable to do so on account of the frictional resistance on the dog 258 due to the pressure of the said dog against the stop 263 by the superior spring 224. A tap of the finger on the key 216 will momentarily release this pressure and allow the key 217 to return to its normal relation to the lever 223 and allow the latter to return to normal position.

In order to release the clutch member 240 from the clutch member 238 when the case shift key or shift lock key 217 is depressed, a bell-crank 264 is pivoted to the side of the credit balance key lever at 265 and its arm has a stud 266 lying beneath the front end of the lever 248. This bell-crank 264 extends down alongside of key lever 217 and it has an inclined slot embracing a stud 268 on the side of said lever 217. The inclination of this slot is such that a depression of either of the keys 216 or 217 rocks the bell-crank 264 clockwise in Fig. 5, rocking the lever 248 counter-clockwise and breaking the toggle 244, 245 and pulling the clutch member 240 out of engagement. As shown in Fig. 5, in this operation the credit balance key remains in its upper position. By this means characters other than numerals can be printed in upper case without operating the change gear mechanism.

Depression of the credit balance key 173 moves the parts to the position shown in Fig. 4. In this operation bell-crank 264 acts as a push link on the stud 268 and first rocks shift lock key lever 217 about its pivot 254 and then rocks the lever 223 the same as if the shift lock key itself had been directly operated. The result is that the locking dog 258 comes into operation and locks the lever 223 down. In this operation the lower end of the bell-crank 264 passes over a stationary stop 270, consisting of a finger of sheet metal projecting inward from the stationary framework. When the operator's finger is removed from the key 173, the spring 252 restores said key. It will be perceived that the depression of the key 173 in the manner described involves both a downward movement of the bell-crank 264 as a whole and also a counter-clockwise rotation of it about its pivot 265. The result is that the stud 266 is moved entirely away from the lever 248 and does not rock said lever. The clutch member 240, therefore, remains in engagement and when the platen frame is shifted, shaft 225 is rotated and the shift gear mechanism for the two master wheels are both reversed in the manner and by the means well known in the Remington machine.

The cross totalizer 153 is provided with an extra shaft 275 having journalled thereon a set of thirty-toothed wheels 276, one meshing with each of the carrier wheels 158, as best shown in Fig. 6. Each of the gears 276 has riveted thereto a spacer 277 and a disc 278. Each disc 278 has three teeth 280 projecting therefrom and capable of being sensed so as to read the indication of the wheel. The totalizer has one carrier wheel at its extreme left-hand side not connected with a dial, but provided with a special disc 281 shown in Fig. 7, and which will be more particularly described presently. Two special plates with sensing teeth will be described in the proper place.

The sensing unit for reading the cross-totalizer has a framework comprising a left-hand frame plate 282 mounted on two frame rods 283 and 284 of the machine. A piece of insulating material 285 is in the shape of an arch or segment of a cylinder, whose end is secured to plate 282 by screws. The right-hand end of this arch is supported by a frame member 286 (Figs. 3 and 11) also secured to the rods 283 and 284.

The means for sensing the digital positions of the totalizer wheels consists essentially of a series of ten sensing fingers 287 adapted to make electrical contact with the teeth 280. These fingers have their ends projecting into the paths of movement of the teeth 280 as the latter travel with the carriage. They are arranged in an arc about the shaft 275 and are spaced 12° apart in said arc, the same as the teeth of the wheels 276, and they are so situated that when in the leftward travel of the carriage a particular carrier wheel 158 is in mesh with the master wheel 156, one of the teeth 280 of its meshing wheel 276 is in contact with a finger 287 as shown in dotted lines in Fig. 12.

Figure 12:
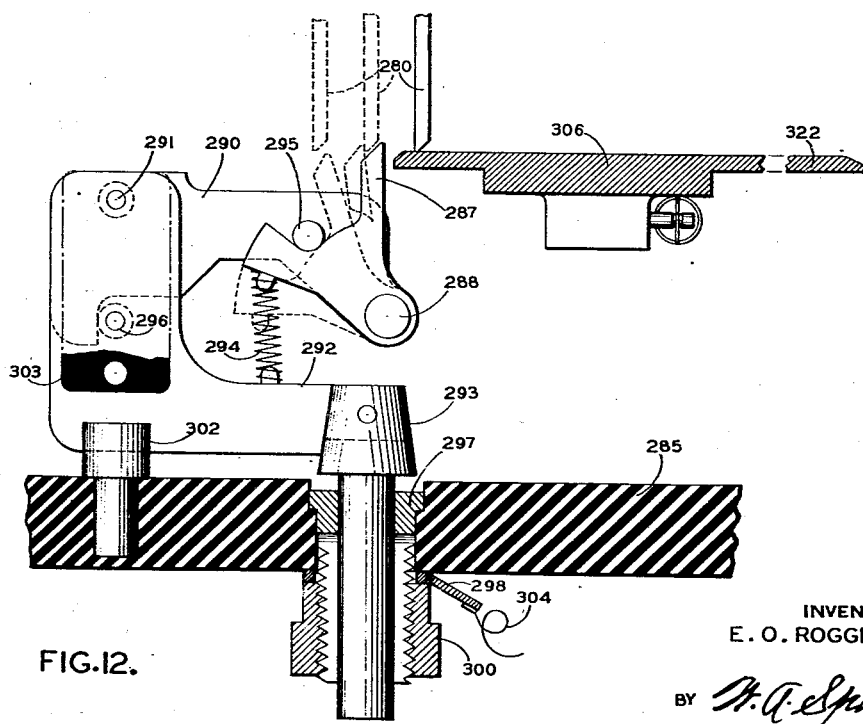
Fig. 12 is an enlarged section view illustrating the action of the sensing teeth of the totalizer wheels on the selector and sensing devices.

Each finger 287 (Fig. 12) is pivoted at 288 to a support 290 which is itself pivoted at 291 to a fixed but adjustable plate 292, secured to a post 293 which passes through and is supported by the arched insulator 285. A spring 294 is compressed between the plate 292 and a branch of the finger 287 tending to rock said finger clockwise about its pivot 288, such rocking being limited by a pin 295 on the support 290. The construction is such that the finger has a fixed rest position relative to the support 290 from which it is free to swing leftward but not rightward. The pressure of the spring 294 tends to rock the support 290 counter-clockwise, its motion in that direction being limited by a stop pin 296. This support, therefore, has a definite rest position from which it is free to swing clockwise only, the finger 287 swinging with it. The right-hand end edge of the tooth 280 and the left-hand end edge of the finger 287 are beveled so that, when the tooth is traveling with the carriage toward the right it cams the finger out of its path. As the finger 287 cannot swing rightward about its own pivot, the support 290 swings clockwise. The radius from its pivoted center 291 to the end of the finger makes an acute angle with the line of travel of the tooth, so that the finger is swung out of the path of the tooth and snaps in behind it after a relatively short travel of the carriage, as will be apparent from Fig. 12. On the other hand, the radius on which the finger swings to the left about its pivot 288, as the carriage steps leftward, makes normally nearly a right angle to the line of carriage travel, so that the tooth is in contact with the finger through a materially greater extent of the travel of the former, before it moves out of its path and snaps back. In Fig. 12 a tooth 280 is shown by solid lines one step to the right of its active position. It will be seen that the tooth when stepping leftward to its active position shown in dotted lines makes contact a little before it reaches its rest position and does not lose contact until it has moved a considerable part of its next succeeding step also shown in dotted lines. This is important, because the escapement and the tabulator stops which arrest the carriage are at the rear thereof and the totalizer at the front, and when the carriage is arrested there is a certain amount of overthrow of the totalizer, which vibrates right and left for a moment and to some extent, and this must not cause the tooth to lose contact with the finger. The present construction has proven highly successful in this regard.

The post 293 passes through a threaded sleeve 297 having a washer 298 and a nut 300, a conductor wire 304 being soldered to the former. The sleeve has a square head seated in an internal angular groove in the insulator 285 to prevent the sleeve from turning. Said sleeve is cross slotted at 301 (Fig. 6) so that, when the post 293 is adjusted in and out of its correct position and the nut is tightened, the V threads clamp the slotted sleeve against the post and retain it in adjusted position. Each plate 292 is seated in a slot in a short post 302 seated in the insulator, so as to prevent said plate from swinging and permitting of the described in and out adjustment. Each plate 292 may have a sheet 303 of insulation fastened to one face thereof to avoid any danger of contact between adjacent plates. It will be seen that all of the fingers 287 are insulated from the frame of the machine and from one another, so that a circuit may be established from a tooth 280 to one of the wires 304. All of the wires 304 and some others presently to be described, are collected into a cable 309 (Fig. 2).

As shown in Fig. 12, the normal position of a finger 287 is just to the right of the rest position of a tooth 280, so that said fingers do not interfere with the rotation of the totalizer wheel. When in a total-writing operation a tooth 280 makes contact with a finger as shown in dotted lines, a circuit is closed which causes the register wheel to be turned to zero. In this rotation the tooth moves out of contact with the finger which immediately snaps to its normal position shown in full lines, where it is out of the way. This whole structure may be shielded by a cover plate 305.

In order to detect the arrival at the master wheel of the totalizer wheel which at the time registers the last digit other than zero, the following mechanism is provided (Figs. 2, 3, 8, and 12). Just at the right of the row of sensing fingers 287 there is mounted a metallic arch-shaped detector 306. This detector is mounted on an arm or lever 307 which is pivoted at 308 to a block 310 secured by screws 311 to the insulating arch 285, so that the detector can swing about its pivot toward and from the wheels 276. One of the screws 311 has a washer 312 to which is connected a conductor wire 313. The inward motion of the detector is limited by an adjusting screw 314 at the lower end of the lever 307, said screw being adapted to strike a block or finger 315 of metal, which is secured to the insulator 285 by a screw 316 having a washer 317 to which is fastened a conductor wire 318. In order to secure the proper adjustment to the detector 306, said detector is pivoted at 320 to the arm 307 and two adjusting screws 321 on opposite sides of the pivot enable the detector to be adjusted about the pivot 320 and held firmly in adjusted position. In use the whole swinging member is one rigid structure pivoted at 308. Access to it is afforded by a cutout in the insulator 285 as shown in Fig. 2.

As best shown in Fig. 12, the right hand edge of the detector is beveled at 322 so that the teeth 280 may cam the detector outward during the travel of the carriage toward the left. The bevel on the teeth themselves will cam it outward during the rightward travel. The detector is driven toward the totalizer wheels by a light spring 326.

The arc covered by the detector is of an extent equal to nine tooth spaces of the wheel 276 and it is so positioned that, if a wheel stands at zero, one of its teeth 280 will be just above the upper edge and another of its teeth just below the lower edge of the detector, as shown in Fig. 8, so that a wheel standing in this position will not hold the detector in its outer position. If, however, any wheel registers a digit other than zero, one of its teeth 280 engages the detector and holds it a short distance away from the wheel, as shown in Fig. 3. The contact screw 314 is so adjusted that, when there is no wheel behind the detector registering a digit other than zero, then the detector will swing inward until the screw 314 touches and is arrested by the block 315, and will thereby make electrical contact between the wires 313 and 318; but a wheel in any other position will hold the detector outward and prevent the screw 314 coming in contact with the wire 315. The left-hand edge of this detector (Fig. 12) is at such a distance to the right of the fingers 287 that, when a totalizer wheel is in engagement with the master wheel and its tooth 280 is in contact with one of the fingers 287, the next wheel to the right of it will still be behind the detector. When the last wheel that registers a digit other than zero moves into engagement with the master wheel, therefore, the detector will be freed and its spring 326 will close the contact 314—315. The detector 306 is at least long enough toward the right so that, when the highest totalizer wheel is in engagement with the master wheel, the lowest wheel will be behind the detector.

In order to determine at the very beginning of a total-writing operation whether the balance registered on the totalizer is positive or negative, the left-hand wheel 276 has its disc 281 made in the form shown in Fig. 7. It differs from the disc 278 in that instead of having three teeth 280, it has fifteen teeth 2800, one at every other tooth-space. This wheel is never turned except by a transfer from the highest totalizer wheel provided with a dial. This left-hand wheel, therefore, in correct operation never registers any digits except zero and nine, the former when the total is positive, and the latter when it is negative. One tooth 280 would suffice to detect this difference, but it is considered preferable to put in a full set of them partly to simplify the assembling of the machine, but mainly because, through some unusual operation, the wheel may become accidentally rotated, as for example, by a great over-running of the capacity of the totalizer. Any even numbered position of this wheel will indicate a positive total, and any odd numbered position a negative total, with the understanding that in normal operation, this amounts to a zero indication or a nine indication. In order to sense this special wheel, a special sensing finger 2801 (Figs. 6 and 7) is set three tooth-spaces above the zero sensing finger 280. It is mounted like the other sensing fingers on a post 2931, except that this post and the sensing finger itself are situated one letter-space distance to the left of the plane of the other sensing fingers, as indicated by the position of this post 2931 in Fig. 2. The result is that, when the carriage is tabulated to the highest wheel for which the totalizer is adapted, that is to say, to the second wheel from the left, the finger 2801 comes into action at the same time as one of the fingers 280. This special sensing finger is connected with a wire 328 (Fig. 6), the electrical connections from which will be described hereinafter.

Figure 11:
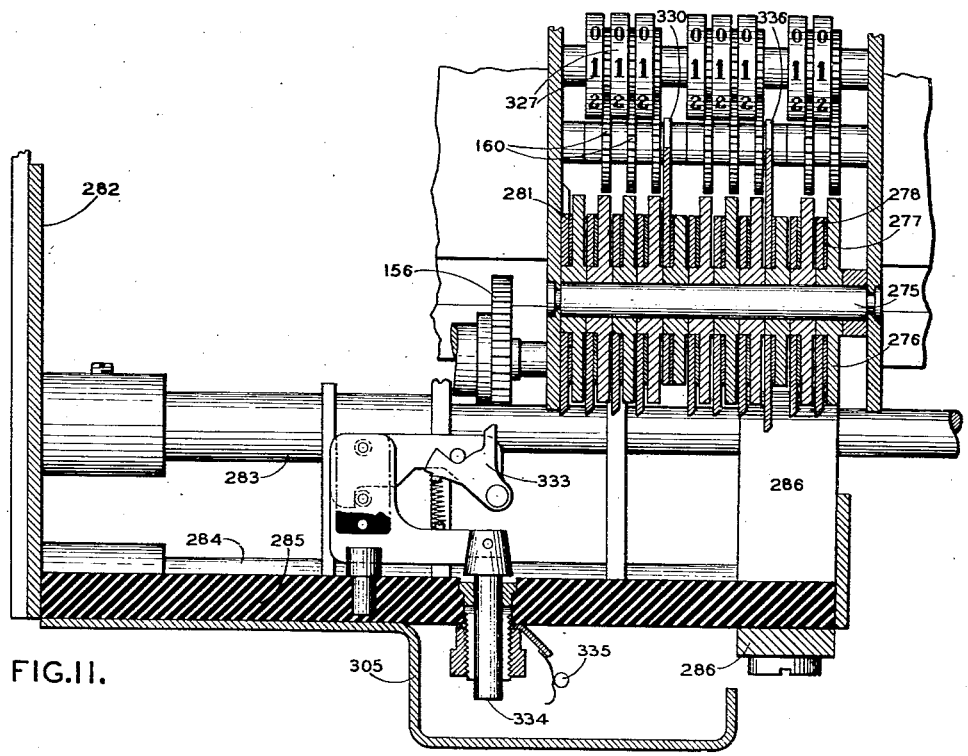
Fig. 11 is a front view of some of the mechanism shown in Fig. 6 and on the same scale and in section on line 11—11 of Fig. 6.

Remington totalizers are sometimes spaced for punctuation by commas, one such space being shown in Fig. 11. When this position of the totalizer reaches the master wheel, the carriage is automatically letter-spaced under the control of a built-up disc 330, the outline of which is shown in Fig. 9. This plate has a hub occupying one letter-space position on the shaft 275, and an arm or branch extending upward and forked to embrace the shaft 331 on which the idler pinions 160 are journalled, this arrangement being to prevent rotation of the disc. This disc has a tooth 332 (Fig. 6) one tooth space above the zero position of a wheel 276. This tooth 332 is longer than the teeth 280 and it cooperates with a sensing finger 333 similar to the sensing fingers 287, but shorter so that it will not be affected by one of the teeth 280. This sensing finger 333 is mounted on a post 334 connected to a wire 335, whose electrical connections will be described hereinafter.

The totalizer also has a blank space for the decimal point and this is occupied by a plate 336, whose outline is shown in Fig. 10. It is like the plate 330 except that its tooth 337 occupies a position one tooth-space behind the nine position of the wheel. This tooth 337, like the tooth 332, is longer than the teeth 280 and it is engaged by a fore-shortened sensing finger 338 (Fig. 6) secured to a post 340 and connected to a wire 341 whose electrical connections will be described hereinafter. The said connections not only cause a letter-space step of the carriage, but also perform another function which will be described.

Figure 19:
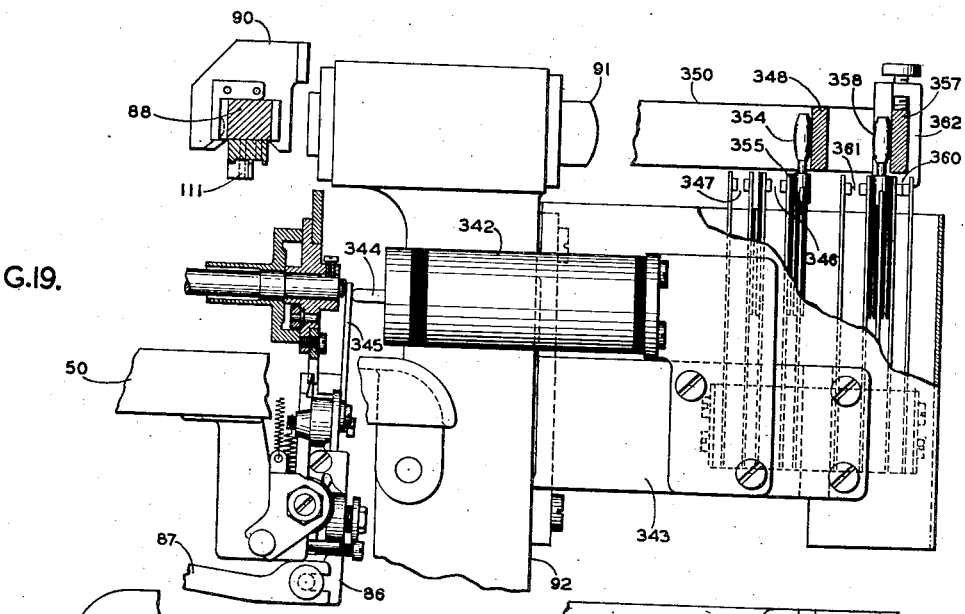
Fig. 19 is a fragmentary right-hand side elevation partly in section and showing the carriage escapement mechanism, certain circuit controllers and associated devices.

The automatic spacing of the carriage is effected by a solenoid 342 (Figs. 19, 20, and 21) mounted on a bracket 343 secured to the frame or casing 92 for the tabulator stops. This solenoid has its plunger 344 in position to push forward an arm 345 secured to the rear surface of the dog-rocker 86. The momentary reciprocation of this plunger will operate the dog-rocker the same as the ordinary link 87.

In order to control the electric circuit by the typewriter carriage in a manner to be explained hereinafter, the following devices are provided (Figs. 1, 2, 19, 20, and 22). The bracket 343 projects some distance rearward and includes a leftward projecting branch to which is secured a group of contact springs separated by insulating material in the usual way, and comprising two pairs of contacts 346 and 347, the latter in front of the former. The Remington machine as sometimes manufactured includes a long transverse bar 348 mounted on the typewriter carriage by arms 350 at its ends. The bar is utilized to support one or more adjustable cam blocks 351 which may be adjustably secured to the bar in any suitable way. As here shown each said block is secured to a loop 352 partially surrounding the bar 348 so that it can be slid lengthwise of the bar to any suitable position, where it can be secured by a set screw 353. This block is on the forward face of the bar 348 and its left-hand end is inclined as shown so as, in the leftward travel of the carriage, to cam forward a roller 354 mounted on the upper end of a spring-leaf 355 secured to the bracket 343 along with the other spring-blades and insulated from the contact springs. As the carriage travels toward the left, the block 351 will cam the roller 354 toward the front of the machine, first closing the contacts 346 and then closing the contacts 347. This block is so adjusted on the bar 348 as to close these contacts in that step of the carriage in which the highest significant wheel of the cross totalizer is brought into engagement with the cross master wheel in the total or balance column. As will hereinafter appear, the result is that the electric circuit for the automatic writing of a total is closed or energized at that instant.

The high part of the cam block 351 is of such length as to keep the contacts closed during the whole travel of the wheels of the cross totalizer over the master wheel. After writing the last digit of the total, the carriage steps as usual to the sub-units position. At the right-hand end of the block 351 there is a step 356 lower than the high part of the block so that in the sub-units position, the roller 354 occupies a mid-position between its normal position, where the contacts are open and its forward position where the contacts are closed. In this sub-units position the roller holds the contacts 346 closed but leaves the contacts 347 open. As will be explained this is in order to break the circuit to the numeral printing solenoids without breaking that of the solenoid for writing a clear signal.

When it is desired to write a running or read total (without clearing the totalizer) another cam block 349 like the block 351 may be mounted on the bar 348 to the left of said block 351. A second bar 357 is mounted behind the bar 348 and carries a short contact block 362 which, in the sub-units position of the column defined by block 349, deflects another follower roller 358. This controls two pairs of contacts 360 and 361, the former normally closed and the latter normally open. This is to control the printing of a certain special symbol as will be explained.

Figure 20:
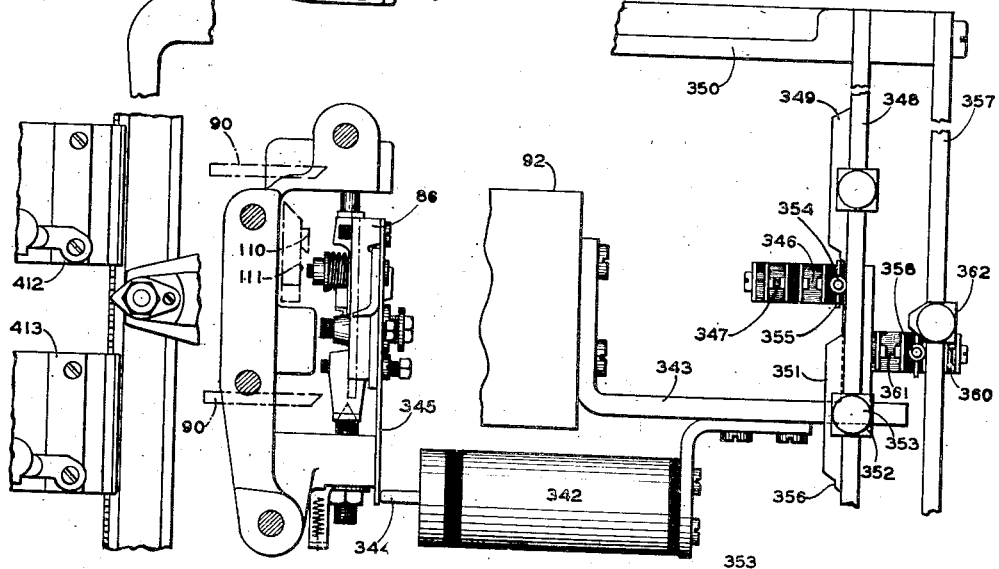
Fig. 20 is a top plan view with parts broken away of the mechanism shown in Fig. 19 with certain schematic additions thereto.
Figure 21:
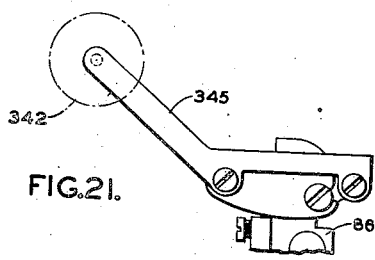
Figs. 21 and 22 are fragmentary views in rear elevation and in perspective respectively of some of the devices shown in Figs. 19 and 20.
Figure 22:
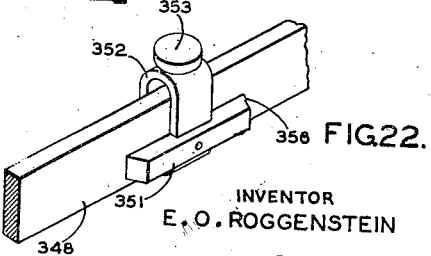

In Fig. 20 the parts are shown diagrammatically in a position between the sub-total and clearing total positions of the carriage. The arm 110 is shown deflected rearward by the cam block 111, and the carriage is, therefore, running free under control of the automatic tabulator.

The clear signal mechanism includes the usual comb feeler 363 resting on the teeth of the dial pinions and, when the last totalizer wheel comes to zero position, they are permitted by the aligned fore-shortened pinion teeth 365 to assume the position shown in Fig. 6, under the pressure of a spring 371 acting through the articulated arms 366 and 367. When any pinion is turned to a position other than zero, its full-length teeth swing the feeler clockwise and the bell-crank 367, 370 counter-clockwise, moving the projecting finger 370 from its clear-signifying position shown in full lines to its non-clear position indicated by dotted lines. When, the totalizer being cleared, it jumps back to the right at the end of a column, finger 370 runs under and lifts the usual cam 372 (Fig. 18) which is secured as usual to a lever arm 373 pivoted at 374 to a frame plate 375 and acted on by a spring 376. When the totalizer is not clear, the finger 370 does not touch 372. In the present machine, the finger 370 and cam 372 constitute the contacts to close a clear sign-printing circuit, and the plate 375 is, therefore, insulated by sheets, washers and sleeves 380 of insulating material separating the plate 375 from the casting 145 and from the securing screws 378. A wire 381 is secured to said plate and forms part of the circuit.

The Remington machine includes a disconnect key 382 consisting of a lever pivoted on a frame bracket and projecting from the front of the machine. This lever may be depressed by hand with the effect that the links 82 (Fig. 1) become ineffective to actuate the computing mechanism. With this key in its depressed position where it can be latched by a small lever 383, the machine becomes a mere typewriter and the register wheels do not turn. It is customary in the Remington machine to use a star key lock as a part of the clear signal mechanism, and it is customary to provide means whereby this lock cannot be released when the disconnect key is depressed. Mechanism for this purpose, well-known in the machine, includes the following parts:

In Fig. 18, 384 designates several of the vertical frame bars constituting parts of the framing of the actuator. Between two of these there is mounted a frame bar 385, having pivoted thereto at 386 a peculiarly shaped lever 387 controlled by a spring 388 tending to rock it clockwise. Disconnect key 382 rocks a lever 390 whose principal function is to throw out of action certain full-stroke devices, said lever being pivoted on a frame post 391. It has a rearwardly extending arm overlying a leftward extending arm of the lever 387 so that when the key is depressed the last named lever is rocked counter-clockwise drawing leftward a link 392 to which is secured a plate 393 sliding in one of the frame plates 384. This existing mechanism is utilized in the present machine to close an electric circuit whose purpose is to disable the automatic clear-sign printing mechanism. To this end a stationary bar or arm 394 (Figs. 17 and 18) is secured to a stationary plate 375 by means of screws 395. A sheet of insulating material and suitable washers and sleeves of the same material 396 insulate this bar 394 from the bracket 375. At its left-hand end at 397 this bar has pivoted thereto a depending lever 398 arranged to be rocked by a spring 401 attached to the bar 394, counter-clockwise, pressing said lever against a sleeve 402 of insulating material surrounding the screw 403 by which the plate 393 is secured to the wire link 392. When said link is drawn leftward by the depression of the disconnect key 382, it rocks the lever 398 clockwise, moving a contact spring 404 mounted thereon into contact with the head of a bolt 405 which is secured to the bar 394 through insulation 406. This bolt has a wire 407 connected thereto and another wire 408 is connected to the bar 394. The construction is such that when the disconnect key is down electric connection is made between these two wires 407 and 408. It will, of course, be understood that the details just described have been used merely to adapt this electrical contact to the mechanism already in the machine. Any suitable contacts may be employed to close a circuit when the disconnect key is depressed.

In order to make clear the operation of the invention a characteristic set-up of the machine is illustrated, more or less diagrammatically in Fig. 2. In this set-up the left-hand vertical totalizer has its subtract cam 165 set in its uppermost position so as to cause numbers written in the column defined by said totalizer to be added in the cross totalizer and it is accordingly marked DR on the drawings. A second vertical totalizer marked CR has its cam 165 set to cause subtraction in the cross totalizer. After an interval another cross totalizer or dummy is set to define a total column. If this was all that was required, that is to say, a column of numbers to be added, a column of numbers to be subtracted, and a column for totals, this totalizer or dummy would have its cam 165 set for subtraction. In the present instance, however, this column is used for sub-totals or running totals and the cam is, therefore, set in its middle position which disconnects the master wheel of the cross totalizer and said dummy is marked ST. A fourth totalizer or dummy marked T defines a column in which the cross totalizer is cleared and the cam 165 of this totalizer is, therefore, set for subtract. At the third or running total column, there is on the bar 348 a cam block 349 and on the bar 357 a cam block 362; and at the fourth or total-with-clearing column, there is a cam block 351, as hereinabove described. These are shown in Fig. 2 by a sort of mirage effect at the top of the figure. As a matter of fact they would be hidden behind the other parts. A sheet of paper 414 is shown with two lines of numbers typewritten thereon. This sheet is weakened along the vertical line 415 so that the right-hand part containing the same balance as the left-hand part may be torn off, leaving the left-hand part as a statement. It will be noted that the balance in the second line is negative and that it is printed in distinctive slanting or italic characters.

In this set-up of the machine the space between the second and third and also the space between the third and fourth totalizers would be bridged on the tabulator column stop bar 88 (Figs. 1 and 19) by an automatic tabulator cam block 111 of the sort above described and of such length and so disposed that after the operator has written the last digit of the item in the second column, the carriage immediately jumps to the highest visible denomination of the third vertical totalizer. The total is then automatically written without affecting the cross totalizer 153 because the cam 165 is set for disconnect. After writing a certain special symbol at the end of the total in column ST another of the cam blocks 111 causes a second automatic tabulation of the carriage to the highest position of the fourth vertical totalizer. In the column defined by this totalizer the total is again written and this time the cross totalizer is cleared, resulting in the printing of the clear sign as will be described. In the step of the carriage following the writing of this clear sign the power operated carriage return mechanism comes automatically into operation so that the carriage is automatically drawn to the right and the paper line-spaced. The only work done, therefore, by the operater is to tabulate the carriage to the desired denominational positions in the first and second columns and type the items. All of the remaining operations, viz., tabulating the carriage, writing the sub-total, again tabulating, writing the total and returning the carriage, are all carried out in an automatic sequence of operations, as will be explained in connection with the description of the electric circuit.

The clear sign and the special symbol for sub-totals are printed by two of the type bars 54 at or near the right-hand end of the series of type bars. These type bars are operated by levers 56, pawls 66 and the snatch roll 64 like other character type bars, but the levers 68 associated therewith are replaced by the two-armed levers 416 whose front ends overlie the plungers of vertically disposed solenoids 417 and 418, respectively, the latter being hidden behind the former in Fig. 1. The rear arms of said levers are each adapted to press the pawl 66 into engagement with the snatch roll, when the solenoid is energized.

A special frame is provided for supporting most of the electrical devices of the machine, its principal member consisting of a casting 420 (Fig. 1) in the shape of a rectangle supported by four posts 419 and having the frame 62 of the motor mechanism removably mounted on top of it. This frame and the parts mounted on it thus constitute the base section of the machine. Mounted on the front bar of the frame 420 are ten solenoids 421, one for each of the ten digits. Each of the detents 73 is extended downward into a lever of the first order lying just behind the plunger of one of these solenoids so that an energization of any of the solenoids will trip the appropriate detent, causing a rotation of the associated cam 71 and an actuation of the computing mechanism and the printing of the digit the same as a depression of a numeral key. The construction is such that by removing certain nuts and screws, the frame 62 may be lifted off of the frame 420 and replaced without being obstructed by these levers 73. The solenoids 417, 418 have a like convenience. When the frame 62 is lifted off the frame 420 the levers 416 are simply lifted away from the solenoids and, when the frame is replaced, these levers come back into proper position, these operations involving no disconnection or reconnection of parts. The electrical equipment includes a number of relays some of which appear in Fig. 1 and the others are disposed in much the same way as those shown, being mounted on brackets from cross bars or plates of the frame 420. The exact disposition of these parts is, of course, a mere matter of convenience as they are connected with the mechanism only by wires. Fig. 1 shows a rectifier 422 and a transformer 423, these and some other parts being mounted on a rearwardly projecting shelf of the frame 420.

The circuit diagram of the described machine is comprised in Figs. 23 and 24 which together constitute a single diagram. Current is supplied over two wires 425 and 426 connected to an ordinary AC house circuit. In one of these is the main switch 427 from which a wire 428 leads to the motor 430 of the machine, another wire 431 leading from the motor to the source wire 426. The two source wires lead to the primary coil of a step down transformer 423, the secondary coil of which is connected with wires 433 and 434, one of which contains a switch 435, hereinafter called the unit switch, which when open breaks the circuit of the automatic total writing unit leaving the motor still operative. The rectifier 422 is shown of the copper plate type comprising two end positive plates 436 and 437, a middle negative plate 438 and two plates 440 and 441 connected to the secondary coil of the transformer, the wire 434 from which leads to the plate 440. The wire 432 leads from the switch 435 through a binding post 442 and wire 443 to one of the contacts 346, which contacts as hereinbefore described are controlled by the cam block 351 on the typewriter carriage. The other contact 346 is connected by wire 444, binding post 445, and wire 446 to the A. C. plate 441 of the rectifier. The construction is such that this rectifier is dead except when the contacts 346 are closed by a contact block 351, which, as hereinbefore explained, occurs only in the sub-total and total writing column positions of the carriage. The whole total writing apparatus, therefore, is operative only in those positions of the carriage.

The positive side of the rectifier is grounded on the machine as shown in Fig. 23, the two plates 436 and 437 being connected together by a wire 447 which leads to a binding post 448 and to ground, meaning that it is attached to the frame of the machine. The negative plate 438 of the rectifier is connected to a wire 450 and binding post 451. Wire 450 has a branch 452 leading to the blade of one of the contacts 137, which contacts, as has been explained (Fig. 16), are normally closed but are opened under certain operating conditions. In the present instance, these contacts are opened whenever the tabulator mechanism or the carriage return mechanism is in operation. The other contact 137 is connected by wire 453, binding post 454 and wire 455 to the coil of the starting relay RI, the other side of which is grounded by wire 455'. It will be recalled that there is no current in the D. C. circuit, except when the contacts 346 are closed by the entry of the carriage into a total column and that this entry is effected by the automatic tabulator mechanism. Therefore, at the time when the contacts 346 are first closed, the contacts 137 are opened. As soon as they close, which they do when the automatic tabulator ceases to operate, the relay RI is energized and remains energized throughout the total writing operation including the time when the block 351 (Fig. 20) reaches the point, namely, in sub-units position, where the follower 354 rests on the low step 356 of the block. For reasons which will be explained, this is a slow operating relay.

The armature of relay RI closes a pair of contacts 456, to one of which the wire 455 is connected. The other contact is connected by wire 457 to the coil of a low resistance, quick-acting relay RIII which is connected by wire 458 with one of a pair of contacts 460 normally closed but adapted to be opened on the energization of relay RIII. This is the circuit breaking relay for the operating solenoids and these contacts 460 take any sparking that may occur when the circuit is broken by rotation of the wheels 276 (Fig. 6). The two contacts are, therefore, connected to a condenser 461. The wire 462 from the other contact 460 leads to one of a pair of contacts 463 normally closed but adapted to be opened by energization of the timing relay RIV which is a slow release relay whose circuit will presently be described. As will presently appear, the wire 474 connected to the other contact 463, is the common return wire for most of the operating magnets of the machine, and the return circuit includes the relay contacts just above described. These operating magnets are designed to be energized momentarily and not to be reenergized until certain mechanical operations have taken place, and these relays time them accordingly as will be described more in detail hereinafter.

The binding posts 442, 451, etc., above described, are on a pair of bars 464 and are provided merely for convenience in collecting the wires at the extreme rear of the machine and connecting them with those of other parts of the machine. They are so constructed that all of the wires shown above the bars 464 are permanently connected to one part of the several binding posts and those below it to another so that in disassembling the machine it is easy to disconnect these wires in such a manner that they can be readily connected up again without making mistakes.

At another part of the machine there is another pair of these bars 465 (Fig. 24) which in addition to the use just mentioned are also useful because the wires at the right of said bars 465 go to the typewriter parts and the wires at the left go to parts in the base of the machine, and as these are separable parts it is convenient to have a set of binding posts where the circuits can be disconnected and reconnected in the process of disassembling and reassembling the machine. In the future description binding posts in these bars 465 will be ignored, and the several wires will be treated as continuous wires.

Referring to Fig. 24, the ten wires 304 from the sensing contacts 287 lead to the contacts of relay RVI, namely, to the respective middle spring blades of ten sets of break-make contacts 466. Hereinafter in describing contact assemblies of this kind the lower blade of each assembly will be called the NC (normally closed) contact and the upper one the NB (normaly broken) contact. As will hereafter appear, it is the function of this relay RVI to set the circuits to print the ten-complement of a digit of a negative total indicated on the register. From the contact assemblies 466 the NC and NB contacts lead by ten wires 467 to the respective middle spring blades of ten break-make contact assemblies 468 controlled by relay RV. From the NC and NB contact of assemblies 468, ten wires lead, nine of which, lettered 470, lead to the coils of the respective digit magnets 421 for printing the numerals 1–9. The zero wire 482 will be described separately, but it may be said at this point that it at first leads to the spacing magnet 342 to space the carriage to the first significant digit, and it is then switched to the solenoid 421 of value 0. In Fig. 24 at the right of the contact assemblies 468, the several wires 470 are marked with the numerals 1–0 to indicate the respective values of the solenoids 421 to which they lead. It will be noted that each wire 470 springs from one NC and one NB contact 468, and that each of said contacts is also marked on the diagram with the numeral showing the value of its connected solenoid 421. It will also be noted that each middle spring contact of the several assemblies 468 is marked at the left with the same numeral as its cooperating NC contact. It will also be noted that the numerical value of each NB contact 468 is the 9-complement of that of its cooperating middle contact. It follows that if current be supplied over any middle contact 468 when relay RV is deenergized, the solenoid 421 of like value will be energized; but if said relay be first energized, the current will flow to that solenoid 421 whose value is the 9-complement of that of said middle contact.

Of the wires 467 which lead to the middle contacts of the assemblies 468, each one springs from one NC contact and one NB contact of the assemblies 466. On the diagram Fig. 24, the individual contacts of these assemblies are designated by the numerals 0-9. Those at the right of the diagram, one at each middle contact, represent the respective values of the sensing contacts 287 with which said middle contacts are connected. The numerals at the several NC and NB contacts are those appropriate to the middle contacts 468 with which they are respectively connected by wires 467. It will be noted that each NC contact 466 has the same numerical value as its middle contact 466, and the same as its connected middle contact 468. In short, with both relays RV and RVI deenergized and the circuit active, when one of the teeth 280 engages a contact 287 of value 2, current will flow over 280 (Fig. 6), 287, wire 304, middle contact 466 (2), NC contact 466 (2), wire 467, middle contact 468 (2), wire 470 (2) to solenoid 421 (2). If RV is energized, the circuit will be the same except that, from middle contact 468 (2) the current will flow to NB contact (7), wire 470 (7), to solenoid 421 (7), and the 9-complement of 2 will be printed.

The relay RVI is energized under the control of the sensing member 306 just before writing the last digit other than zero of a negative total. Each middle contact 466 of values 1-9 has its NB contact of a numerical value less by 1 than its own. Therefore, when relays RV and RVI are both energized, and a tooth 280 touches a contact 287 of value 2, for example, current flows from 280 through 287 (2), wire 304, and middle contact 466 (2) to NB contact 466 (1), middle contact 468 (1), NB contact 468 (8), to solenoid 421 (8). The numeral printed will, therefore, be the 10-complement of that indicated on the register wheel. As will be understood from the rule for writing a true negative total from its true complement, only the last digit other than zero, of a negative total, is written in the manner just described.

The middle contact 466 (0) has its NB contact connected to the wire 467 leading to the middle contact 468 (9) which, when writing negative totals (RV energized) connects with NB contact 468 (0), which then leads to solenoid 421 of value 0. Any zeros at the right end of a negative total will, therefore, be printed as zeros. As will hereinafter appear the relays RV and RVI are not energized when the total is positive.

The nine solenoids 421 for digits from 1 to 9 have a common return as follows: wire 471, coil of relay RVII wire 472 to one of the contacts 347 at the rear of the carriage. It will be recalled that these contacts are closed during the time when the register wheels of the cross totalizer are successively engaged with the master wheel but are opened when the follower 354 drops back on to the step 356 of the contact block 351 in sub-units position. In other words, these contacts 347 are closed only when some one of the register wheels or some one of the blank spaces in the register stands at the master wheel. From contacts 347 the circuit leads through wire 473 and wire 474 to one of the normally closed contacts 463 controlled by relay RIV. It will be recalled that the cooperating contact 463 is connected by wire 462 and the other connections hereinbefore described back to the negative plate 438 of the rectifier.

The operation of writing a digit of a positive total other than zero may now be described. Usually, though not invariably, the first digit will be a zero or there may be several nonsignificant zeros which will result in operations of the space magnet 342 as will be described presently. Having arrived, however, at a register wheel showing a digit other than zero, the starting relay R—I will already have been energized, closing a circuit from contacts 456 back to the negative plate 438 of the rectifier. When one of the teeth 280 contacts with a finger 287, a circuit is established through the appropriate one of the solenoids 421 and back by wire 474 to the normally closed contacts 463. From here the current passes through wire 462, contacts 460, wire 458, coil of relay R—III, wire 457 to contacts 456 now closed, thence to negative. The armature of relay R—III controls a make-before-break contact assembly including a contact 475 and a cooperating contact 476, the latter on one of the spring blades of the pair of contacts 460. The result is that a double holding circuit for R—III is established as follows: (a) from ground to coil of relay R—IV, wire 477, contact 475 and contact 476 to wire 458, coil of relay R—III and wire 457 to source; and (b) from ground, resistance 481, wire 480, contacts 478, wire 477, etc. R—IV is a high resistance, slow-release relay. The return circuit of the solenoid 421 is quickly broken at contacts 460 by the energization of relay R—III, and it is again opened, at contacts 463 by the resulting energization of the timing relay R—IV. The energization of the latter also breaks the branch 480, 481 of the circuit of relay R—III. When the circuit through 481 is broken some current still flows through R—III and R—IV. This is not enough to maintain the energization of R—III but is sufficient to make it deenergize more slowly. When it is deenergized contacts 475, 476 are opened breaking the circuit of relay R—IV and contacts 460 are closed. The relay R—IV deenergizes slowly and not until it has released its armature is the return circuit for the digital solenoids restored at 463. The whole arrangement is such as to permit only a momentary energization of the digital solenoids and to leave a certain fraction of a second before the return circuit is restored. The reason for this is, of course, to give the mechanism time in which to have the cam 71 make its rotation, subtracting the digit from the cross totalizer and printing it on the paper, and allowing the carriage to step to such a point that the tooth 280 has escaped from the contact finger 287. If this delay was not provided the digit would be repeated. When the relay R—IV is deenergized the circuit is restored to its normal condition ready for the subtracting and writing of the next digit. It may be remarked that it is possible to time these relays so that the printing of one digit follows that of another quite rapidly.

If the total is positive the highest one or more of the register wheels will usually indicate zero. Means are provided whereby these nonsignificant zeros are not printed but on the contrary the spacing magnet 342 is energized so as to step the carriage without printing until a digit other than zero is reached. For this reason the wire 482 from the zero NC and NB contacts 468 does not lead directly to the 0 solenoid 421 but leads to the middle contact of a break-make contact assembly 483 controlled by the armature of relay R—II. The NC contact of this assembly leads by wire 484, wire 485 and wire 486 to the coil of the spacing magnet 342. The return wire 487 of this magnet is connected with the wire 472 which leads to the contacts 347 and back through the same line of return wires as those described for the digital solenoids. The return circuit for this magnet is broken at 460 the same as that of the solenoids 421 and the circuit is again closed in the same way with a delay to permit the carriage to make its step. This operation will continue as long as zeros are encountered, when the total is positive, or nines when it is negative. When the first wheel indicating a digit other than zero (or nine if negative) establishes a circuit through one of the first nine magnets 421 to print the first significant digit, the circuit is changed so that subsequent zeros are printed. The common return wire 471, of the solenoids 421 of values 1–9, passes through the coil of relay R—VII. When this is energized its armature closes a pair of normally open contacts 488 one of which is connected by wire 490 to ground. The other contact 488 is connected by wire 491 to the coil of relay R—II. The return for this relay includes wires 492, 493, 450 direct to the negative plate 438 of the rectifier. Energization of this relay closes a pair of contacts 495, one of which is connected to the wire 491 and the other by wire 496 to ground constituting a holding circuit for this relay which, therefore, once it has been energized, remains energized until the end of the operation. This relay when energized opens the NC and closes the NB contact of a break-make assembly 483. The middle blade of this assembly is connected to the zero wire 482 from the contact assembly 468 of relay R—V, as above explained. Energization of R—II results in breaking the NC connection of this wire to space magnet 342, and establishes connection through the NB contact and wire 497 to the 0 solenoid 421.

The return wire 498 of the zero solenoid 421 is joined to the wire 472 without passing through the coil of the relay R—VII. The connection between this wire 472 and the negative plate of the rectifier has been traced above, through the circuit breaking and timing relays R—III and R—IV. The comma space disc occupies the fourth position of the totalizer shown in Fig. 11. The tooth 332 on the plate 330 in this position makes contact with the sensing finger 333 which leads through wire 335 to wire 486 and thence to the spacing solenoid 342 whose return circuit has been traced hereinbefore. The result is to letterspace the carriage.

The decimal space is occupied by the plate 336 whose tooth 337 makes contact with the sensing finger 338 which through wire 341 connects with the coil of relay R—VIII. The return wire 500 from this relay connects through wires 485 and 486 to the space solenoid 342 so that the carriage will be spaced through the decimal point also.

It is frequently desirable to go through the movements of taking a total from the cross totalizer when the latter is already cleared. As far as the mechanism heretofore described is concerned such operation would result simply in the succession of operations of the spacing magnet 342 and nothing would be printed except the star at the end of the total. In these conditions it is, however, desirable to write the last two zeros followed by the star to indicate a clear condition of the totalizer. Moreover, the total itself may consist only of a digit in the lowest denomination in which event it is desirable to write the zero immediately preceding that numeral. Five cents would be written 05. It is in order to produce these results that the relay R—VIII is provided. This relay closes a pair of contacts 501, one of which leads by wire 502 through a normally closed contact pair 503 to ground. These contacts are opened by an energization of relay RX whose connections will be presently described.

The other contact 501 is connected by wire 504 with wire 491 whose connections have previously been described as controlling the shift relay R—II. If relay RX has not been energized, the energization of relay R—VIII by the decimal contact 338 results in an energization of the shift relay R—II, which shifts the connection of the zero contact 287 from the space magnet 342 to the zero solenoid 421, with the result that the zeros, following the decimal point, will be printed even though the totalizer contains no digit other than zero above the decimal point.

The circuit is so arranged that, if the cross totalizer is not clear, the total will be printed even though the disconnect key is operated, but nothing will be printed by the total printing unit if the totalizer is clear. It is for this reason that the contacts 404, 405 (Fig. 18) are provided. The wire 408 from one of these contacts leads directly to the coil RX and the wire 407 from the other contact 405 connects with the wire 318, which leads to the contact 315 (Fig. 3), hereinbefore described. This contact is adapted to make contact with the screw 314 on the detecting device 306, 307. It will be recalled that this detecting device is held in its forward retracted position whenever there is any wheel under it indicating a digit other than zero. When the totalizer is clear, the arch shaped piece 306 will be in its rearward position and contact will be made at 314, 315. The wire 313, connected with the piece 307 (Fig. 3), leads to ground as indicated in Fig. 24. When the totalizer is clear, therefore, the closing of the contacts 404, 405 by the depression of the disconnect key will energize the relay RX and break the contacts 503. It will be recalled that it is through those contacts that relay RVIII energizes relay RII. When contacts 404, 405 are closed, relay RII will not be energized and no printing will occur either of zeros or of the clear sign. It will be noted that this circuit is not completed through 314, 315 if there is a number in the totalizer, so that such a number as 05, for example, would be printed notwithstanding the disconnect key was depressed. This number, however, or any number printed under these conditions, would not be followed by the clear sign, because, the computing mechanism being disconnected, the totalizer would not be cleared.

The printing of the clear signal is controlled as hereinbefore explained by the fact that after writing the total and clearing the totalizer when the latter jumps back to normal condition, an electrical contact is made from ground through finger 370 and cam piece 372 to wire 381. This wire leads to one of a pair of normally open contacts 505 which are closed by the energization of the relay RII. It will be recalled that this relay is energized by the writing of the first digit of the total other than zero, and it is also energized by the decimal space contact when there is, above the decimal point, no digit other than zero. Normally open contacts 505 assure that the clear signal will not be printed unless this relay RII has been energized, that is to say, unless either some total has been printed or else the disconnect key has not been depressed.

The other contact 505 leads by wire 506 to one of the normally closed contacts 360 controlled by the follower 358 hereinbefore described. This follower is operated by the travel of the carriage at sub-units position of the running total column in cases where such a column is provided for. At that position the cross-totalizer is ordinarily not clear, but the sign will not be printed even if it is clear, because contacts 360 are open. The other contact 360 leads by wire 507 to the star printing magnet 417 hereinbefore described. The return wire 508 for this magnet connects with the wire 474, hereinbefore described, as controlled by the circuit breaking and timing relays RIII and RIV, where the circuit is broken at the proper time.

The reason for the contacts 347 is as follows:
After the printing of the total and when the carriage steps to sub-units position, the cross footer is freed and jumps back to its right-hand position, where it closes the circuit of the clear signal magnet at 370, 372 (Fig. 6). In the course of this jump-back, the 0 teeth 280 brush against the 0 sensing finger 287 and the comma and decimal teeth 332 and 337 against their sensing fingers 333 and 338. In order to prevent energization of the circuits controlled by these contacts, the return of all of these circuits passes through the contacts 347, but the clear signal circuit does not. The block 351 is, therefore, designed as above described, so that, when the carriage steps to sub-units position, it opens all operating circuits except that for the clear sign or the special symbol, leaving contacts 346 still closed, however, in order to keep the unit circuit energized until after the printing of the clear sign or the special symbol.

The contacts 360 and 361 and the follower 358 are used only in case the machine is set up to write a sub-total. Where this operation is not desired these contacts would not be utilized and the wires 506, 507 would be connected at the binding posts 510 by a jumper 511 taking the place of the normally closed contacts 360. When, at sub-units position of the running total column, the follower 358 opens the contacts 360 to prevent printing of the clear sign, it also closes contact 361 to cause the printing of a special sign to designate a running total. This establishes a circuit as follows: from ground over wire 512, contacts 361, wire 513, coil of symbol-printing solenoid 418, to return wire 508 which has already been described. The result is that at the end of the operation of writing a sub-total this magnet 418 is energized and a special symbol is printed, such, for example, as a Δ.

As will be more fully described hereinafter, when printing a negative total the platen of the typewriter is shifted to upper case position so as to write the negative number in distinctive characters. This may result in the clear sign and the special symbol being also printed in distinctive characters if desired to indicate negative balances as appears in Fig. 2.

The writing of a negative total is initiated at the first arrest of the carriage in the highest denominational position in the total column. If the total is negative one of the teeth of the disc 281 connected to the extra wheel 276 at the left-hand end of the totalizer will make contact with the finger 2801 connected with the wire 328. This wire leads to one of a pair of normally closed contacts 514 which are opened by the energization of the relay RII. At the moment under consideration this relay has not yet been energized. Current, therefore, flows from the contacts 514 to wire 515 to the coil of quick acting relay RIX whose return wire 516 is connected to the wire 493 which, as hereinbefore described, leads directly to the negative plate 438 of the rectifier. This relay RIX is, therefore, immediately energized. It will be recalled that the carriage reaches the position under consideration by the action of the automatic tabulator which opens the contacts 137 through which most of the return operating circuits of the system lead; also, that the starting relay RI is a slow acting relay. The relay RIX will, therefore, be energized before any action, controlled by a sensing finger 287 engaging the tooth 280 on the highest register wheel, takes place.

The relay RIX closes a pair of normally open contacts 517 to establish a holding circuit from ground by wire 515 through the coil of the relay so that the relay remains energized as long as the total printing operation continues. Relay RIX when energized also closes a pair of normally open contacts 518. Of these one is connected to the return wire 493 which as above described leads to the negative plate of the rectifier. The other wire 520 from this pair of contacts leads through the coil by quick acting relay RV to ground so that this latter relay is immediately energized when the carriage comes into the total writing column. The relay reverses the set of break-make contacts 468 hereinbefore referred to, opening the normally closed contacts and closing the normally open contacts. As will be apparent from the diagram this connects each digital wire 467 with the solenoid 421 for a numeric value equal to the nine complement of the digit. That is to say, the 0 wire 467 will lead to the 9 wire 470, the 1 wire 467 to the 8 wire 470, etc. It will be recalled that in the first part of the operation the zero wire 482 now connected to the nine contact finger 287 leads through the contacts 483 to the space magnet 342 so that now instead of non-significant zeros working such space magnet that magnet will be worked by non-significant nines until some digit is reached other than nine. This latter will result in an energization of the relay RII the same as before described and from that time on nines will be printed as zeros until another change takes place.

It will be recalled that the last digit other than zero of a negative total must be printed by its ten complement. This is brought about by the closing of the contacts 314, 315 when the selecting plate 306 is allowed to move rearward by the fact that there is no longer any wheel behind it registering a digit other than zero. The sensing disc 306, as hereinbefore explained, is grounded through the wire 313. When this disc drops back, therefore, current flows from it to contact 315 and wire 318 to the coil of relay RVI whose return wire 521 is connected to the return wire 520 of the relay RV which, as above explained, leads directly back to the negative plate 438 of the rectifier provided relay RIX has been energized. When this relay RVI is energized it reverses the ten break-make contact assemblies 466 with the result that will be apparent from an inspection of Fig. 24. It will be noted that the wire 304 from the zero contact 287 will now be connected to the nine wire 467 which at this time through the contacts 468 is connected to the zero wire 482 so that the zero contact finger 287 is in electrical connection with the zero solenoid 421. It will also be noted that by a similar route each of the other contact fingers 287 is connected to the solenoid 421 of the numerical value equal to its 10 complement. For example, the 1 wire 304 is now connected to the 0 wire 467 which, by the reversed contact 468, is now connected with the 9 wire 470. As soon, therefore, as this selector 306 drops back, the last digit, other than zero (the wheel registering which is just moving into engagement with the master wheel), will be printed by its ten complement, and any succeeding zeros will be printed as zeros.

The reason why the wire 492 of relay RII leads direct to the rectifier instead of through the contacts 137 is as follows: When the carriage is brought by the automatic tabulator to the highest position of the cross totalizer, contacts are made simultaneously at two points when the total is negative, namely, one of the teeth of the disc 281 of the extra register wheel makes contact at 2801 and at the same time the next wheel, which is the highest wheel connected with a dial, has its tooth 280 in contact with one of the fingers 287. The sensing finger 2801 occupies the space where it would be touched in the travel of the carriage by one of the teeth 280 of any register wheel which registered 7. Unless means were provided to the contrary, therefore, the relay RIX would be energized the first time a wheel registering 7 reached this contact. It is conceivable that the very highest wheel connected with a dial would itself register 7. It is for this reason mainly that the contact 2801 is offset one step to the left of the contact fingers 287 so that if the highest wheel should stand at 7 it would not immediately make contact at 2801. It will be recalled that the wire 328 from this contact leads to a normally closed contact 514 controlled by the relay RII. It is essential that it be broken at this point before a wheel registering 7 reaches the finger 2801. It will be so broken, as explained above, by the printing of the first digit other than 0, which printing occurs when the wheel on which said digit is registered is in the plane of the contacts 287 and just before said wheel reaches the contact 2801.

In the step of the carriage following the writing of the clear sign or the special symbol the contacts 346 open, which disconnects the plate 441 of the rectifier from the transformer and the rectifier, therefore, becomes dead and all relays become deenergized and the electrical system is, therefore, restored to its normal condition.

It may be mentioned that, when using D. C. current, the circuit would be slightly changed. The rules of the underwriters require the negative side of D. C. current to be grounded. In order to assure that this is always done it is desirable to run the current through a rectifier the same as above described except that the wires 425, 426 of the feed cord of the machine would lead to A. C. plates of the rectifier, one of them directly, and the other through the contacts 346 the same as in the A. C. form. In the circuit described it is the positive side of the rectifier that is grounded. When using D. C. current, therefore, the wires 447 and 450 would be interchanged, the former being connected with the negative plate 438 of the rectifier so as to ground that plate and the latter being connected to the positive side of the rectifier and leading to the relays RIX and RX and to the contacts 137. With these exceptions the circuit would be the same as above described. It may be added that the A. C. circuit above described would work the same if the negative side were grounded instead of the positive side, and that, for the sake of uniformity of manufacture, it might be preferable to arrange it that way.

At this point it may be worth while to review some of the features of the circuit.

The carriage controlled contacts 346 are in the main supply line from source to one of the A. C. plates of the rectifier. Until these are closed, the entire electrical system is dead. The contacts 347 are in the return circuit of the numeral printing and space magnets, and they are opened when the carriage steps into sub-units position so that those magnets will not be energized during the jump-back of the cross totalizer.

The positive side of the rectifier is grounded. The wire 450 to the negative plate has two branches. The first leads through tabulator and carriage return contacts 137 and thence to contacts 456 which are open until relay RI is energized. This is a part of the return circuit of the operating solenoids 342, 417, 418, and 421. The other branch from wire 450 connects by wires 493, etc., to the return sides of relays RII, RIX and RX, and also of RV and RVI through contacts 518 of RIX so that any of these may be energized as soon as the contacts 346 are closed by the entry of the carriage into the total column and the total-writing switch 435 is closed.

When the carriage is first brought into the total column by the automatic tabulator, contacts 137 are still open, and the carriage is arrested in its highest position. In this position, a sensing finger 287 is touching one of the teeth 280 of the highest wheel having a dial, and at the same time, if the total is negative the sensing finger 2801 will be touching one of the teeth 2800 of the extra wheel 281. In the latter case the relays RIX and RV must be energized before the digit circuit from finger 287 is energized, so as to shift the circuits to complements, and to initiate the case shift operation. This occurs before the contacts 137 are closed by the ending of the tabulating operation, because the return from relay RIX does not include the contacts 137.

The starting relay RI is made slow acting for two or three reasons. Its circuit is closed by the closing of the tabulator contacts 137, at which time there may still be some vibration of the carriage due to the shock of its arrest; and it is desirable not to start a subtracting operation until this had died down. Also, by some unusual handling of the machine, the carriage may have been brought into the highest position of the total column while the unit switch 435 was still open. If, in such a case, the unit switch is then closed, and the total is negative, relay RV must act before a solenoid controlled by a finger 287. This is effected by making RI slow acting and RIX and RV quick acting.

The automatic space relay RII is so named for its principal, though not its only function. It is energized by relay RVII at the printing of the first digit other than zero, and also by the decimal point contact through RVIII when no such digit precedes the decimal point. When energized its contacts 495 establish a holding circuit for itself; its contacts 483 change the circuit from the space magnet 342 to the 0 magnet 421; its contacts 505 enable the clear sign circuit to magnet 417, so that the sign will be printed only in case the relay has been energized; and its contacts 514 break the shift circuit for negative totals so that said circuit cannot be energized in the course of the taking of a running total by some wheel standing at 7.

The break-circuit relay RIII is a quick acting relay of low resistance (it must operate in series with an operating magnet such as 421 and the coil of relay RVII). It controls a make-before-break contact assembly, first establishing the circuit of timing relay RIV and a brief holding circuit for itself, and then breaking the circuit of whatever operating magnet was energized. Referring to Fig. 12, a digit printing circuit is closed by a tooth 280 contacting a sensing finger 287. If a clearing total is being taken, the register wheel will be turned, unless the wheel already registers 0; otherwise the tooth 280 will pass off of the finger 287 in the latter part of the step of the carriage. In order to prevent sparking at the sensing contacts, relay RIII is timed to break the circuit before either of these two things occur. Also if a 0 is being printed or if a running total is being taken, it might happen by reason of a too fine adjustment that the tooth 280 of the next succeeding wheel might touch its finger 287 before the first tooth had quite escaped from its finger 287, and we would then have two numeral magnets energized at once. Relay RIII is timed to break the circuit before this could occur. In one specific machine according to the invention, the solenoids 421 require about .006 second to operate and the relays RIII about .008 second.

The timing relay RIV is of high resistance and slow acting. It is energized through contacts 475, 476 of relay RIII. When energized its contacts 478 break one branch of the holding circuit of said relay RIII, which, when fully deenergized, breaks the circuit of RIV. Relay RIV when energized opens the operating circuit by contacts 463 and holds it open until it is itself deenergized. As is well understood in the art of relays, it is possible to regulate the speed of relays like this over a considerable range. This one is so regulated as to assure time for the mechanical operations necessary to prepare the machine for another digit printing operation. In the Remington machine, this is some fraction of a second.

The automatic space energizing relay RVII is of low resistance and quick acting. Its function is by momentarily closing contacts 488 to energize the automatic space relay RII, which needs to be of a resistance too high to be included in series, as is RVII, and which, once energized, must be held so until the end of the operation.

The second automatic space energizing relay RVIII, whose circuit is closed at the decimal space, acts the same as RVII, its contacts 501 momentarily closing the circuit of relay RII.

The automatic credit balance relay RIX, quick acting, is energized at the first stop of the carriage in the total column, in case the total is negative. When energized, it establishes a holding circuit for itself by means of contacts 517. By its contacts 518, it establishes a return circuit for relays RV and RVI, neither of which can be energized otherwise. As the former is permanently connected to ground, it is energized immediately, shifting the digit circuits to the nine complements. The latter is connected to ground at the proper time by the detector 306.

The Remington so-called dual bookkeeping machine, as manufactured, has two cross-totalizers instead of one and in Figs. 25 and 26 electric circuits are shown in diagram for printing totals from both such totalizers. The dual machine in hand-operated form is shown in detail in the patent to Wahl 1,349,024, dated August 10, 1920. In that machine provision was made for a hand-control of the cross totalizers by the keys or hand levers 67, 68, and 71, as designated on the drawings of that patent. This hand-control is no longer used in the manufactured machine, the cross master wheels being controlled solely by the followers of two subtract cams, both mounted on the front of each vertical totalizer. The elimination of the hand-control has resulted in the simplification of the change-gear mechanism described in the patent. Also the manufactured machine is now operated by the usual Remington power plant as described hereinbefore. This power operated machine is described in the patent to Hart No. 2,083,994, dated June 15, 1937. It is to this power-operated modern machine that the present invention is applied. The Hart patent discloses clear signal mechanism for both cross totalizers including two arms 281 each carrying a cam piece 280, one such arm and cam piece for each cross totalizer, this being the same as the arms 373 and cam pieces 372 (Fig. 2) described in the present case. For the purposes of the present invention all of the clear signal mechanism of the Hart patent except these arms and cam pieces is eliminated, arms and cam pieces being electrically insulated from the balance of the machine the same as already described herein.

Due to the fact that the Remington dual machine has been manufactured for a number of years and can be fully understood from the two patents above referred to, it has not been deemed necessary or desirable to illustrate the mechanism in the present case. It is identical with that already described except for addition of the extra cross-totalizer and of the extra change-gear and clear signal mechanism, etc., that cooperate therewith. In Fig. 26, the left-hand cross-totalizer is lettered 153L and the right-hand one 153R. Each of these cross totalizers is a duplicate of the cross-totalizer already described, and at each are duplicates of the sensing and detecting units already described, the only difference being that two sets of them are provided instead of one. In the electrical diagram (Figs. 25 and 26) the several wires, contacts, relays, etc., are given the same reference numerals as in Figs. 23 and 24 already described, with an occasional addition of a letter "L" or "R," where it seems desirable to distinguish between the connections to the two totalizers.

With certain exceptions which will be particularly described, the portion of the circuit included in Fig. 25 is the same as that of Fig. 23 and its elements are designated by the same references. The main circuit, the transformer, the rectifier, space magnet, the digital solenoids 421, and the several relays are all identical with those already described, with the exception that one additional pair of contacts is controlled by relay RII. The contact assembly controlled by the carriage through cam follower 354L is identical with the like assembly already described. The cam assembly controlled by follower 354R replaces that for taking a running total and controls the taking of totals from totalizer 153R. This assembly includes an additional pair of contacts 525 which will be described. The cam blocks for controlling the followers 354L and 354R are like the block 351 and, like it, each of them may be placed anywhere desired along the bar 357 so that a total can be printed from either totalizer as desired in any desired column position of the paper.

The solenoid 418 for printing the triangle is retained, but its circuit is now controlled by contacts 347 actuated by the follower roller 354R and in this machine the triangle is a clear sign for the right-hand totalizer as distinguished from the left-hand totalizer, designated by a star. The additional pair of contacts controlled by relay RII is for the purpose of enabling the triangle printing solenoid 418, as will be described in detail hereinafter. The only other change in the diagram shown in Fig. 25 resides in the connections to the pair of contacts 525. One of these is grounded on the machine frame as indicated and the other leads by wire 526 to the coil of a new relay RXI (Fig. 26), whose return wire 527 connects with the wire 450 leading directly to the negative plate of the rectifier. The construction is such that immediately the carriage is stepped, as for example, by the operation of the automatic tabulator, into the column in which the total of the right-hand totalizer is to be written, this relay is energized and shifts a number of electric circuits, as will be described. This relay, like relays RIX and RV, is thus energized immediately on the arrival of the carriage in the column, and without waiting for the working circuits to be activated by the closing of contacts 137 controlled by the tabulator mechanism.

It is the function of the relay RXI to connect the various wires controlled by the two cross totalizers alternatively with the devices to which they relate, the left-hand totalizer being normally connected up for operation, but being disconnected by having each of its circuits broken and the corresponding circuit of the right-hand totalizer closed, when this relay is energized. To this end this relay controls a number of break-make contact assemblies 528. In each of these the lower or NC contact is connected with a device associated with the left-hand totalizer and the upper or NB contact with the corresponding device of the right-hand totalizer; the middle shiftable blade in each instance being connected with the appropriate element of the circuit. Thus, in Fig. 26 the shift contact 2801 of the left-hand totalizer has its wire 328 connected to the lower or NC contact and the corresponding wire of the right-hand totalizer to the upper or NB contact of one of these break-make assemblies, the middle contact being connected by a wire 3281 to the normally closed contacts 514 controlled by the relay RII. This instance is cited as an example. In the case of all the other wires, the wire leading from the middle contact is given the same number as the wires leading to its co-operating contacts but with 1 added. This is done to facilitate comparing the circuit diagram of the dual machine with that of the single machine. Similar remarks apply to the spacing wire 335 and to the decimal spacing wire 341. Similar remarks also apply to all of the wires 304 controlling the digital magnets 421.

It will be perceived that normally all of the control wires from the right-hand totalizer 153R lead to open contacts so that the contacts of this totalizer are entirely cut out of the circuit and also that, when the relay RXI is energized, the wires from the right-hand totalizer are connected up and all those from the left-hand totalizer lead to open contacts.

The clear signal wires, however, do not go to make-break contact assemblies, but are led to separate pairs of contacts. Thus, the wire 381 controlled by the left-hand totalizer leads to a pair of normally closed contacts 530, at the bottom of the series of contacts controlled by relay RXI. The other contact of this pair leads to a wire also numbered 381, which goes to the contacts 505 controlled by the relay RII, the same as in the case of the single totalizer. The wire 381R controlled by the right-hand totalizer leads to another pair of contacts 531 at the top of the series controlled by relay RXI and normally open, but closed when the said relay is energized. The upper one of these contacts leads by a wire 381R to the added pair of contacts 532 controlled by relay RII, said contacts being normally open. The lower one of these contacts leads by wire 533 to the coil of the solenoid 418 which causes the printing of the triangle.

All of the numerical wires 304 from the left-hand totalizer lead respectively to the lower or NC contacts and those from the right-hand totalizer to the upper or NB contacts of the several break-make contact assemblies controlled by the relay RXI, the middle wires from each of which are lettered 3041. These lead respectively to the middle contacts of the assemblies 466 controlled by the relay RVI the same as if they had come directly from one or the other of the cross totalizers.

The balance of this circuit is identical with that already described, though it may be remarked that the wires from contacts associated with the right-hand totalizer lead to a second bar of binder posts 465R.

While I have described what I consider to be a highly desirable embodiment of my invention, it is obvious that many changes in form could be made without departing from the invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In apparatus of the class described, and including a carriage having a leftward travel and a rightward return movement and automatically operating mechanism controlled by electric circuits, sensing mechanism to control a circuit comprising in combination a contact tooth traveling with said carriage, the combination of a contact finger adapted to contact with and to be deflected by said tooth, said contact, when made, closing a control circuit, said finger pivoted with freedom to swing about a center leftward from a fixed normal position, a support to which said finger is so pivoted and itself pivoted with freedom to swing about another center rightward from a fixed normal position, the first said center being so situated that the finger swings leftward without moving its support about the center of a circle whose radius makes a wide angle to the line of carriage travel so that its contact with said tooth is maintained through a certain extent of carriage travel, and the second said center being so situated that when the finger and the support are swung rightward together said finger swings about the center of a circle whose radius makes an acute angle with the line of travel of the carriage so that the finger swings out of the path of the tooth in a materially shorter extent of carriage movement.

2. In a combined typewriting and computing machine, the combination of a step-by-step moving carriage, power operated types capable of printing the digits of a number successively as said carriage travels through a total column, an adding and subtracting totalizer controlled by said carriage, a plurality of electric circuits including a supply portion and portions for operating said power-operated types, means for closing the supply portion of said circuits after the carriage reaches the highest position of said total column, means thereupon acting to sense said totalizer to determine whether the total is positive or negative, means controlled by said sensing means and acting quickly to change one portion of said circuits in case the total is negative, means for sensing the digital positions of the totalizer wheels one at a time, a second portion of said electric circuits controlled by said digital sensing means and acting to initiate selective operation of said power operated types and stepping of said carriage, and slower acting means for closing said second portion of the circuits, whereby the shift for a negative total takes place before the first digit-controlled operation.

3. The combination of a traveling carriage, means including a spacing magnet for imparting step-by-step movements to said carriage, power operated types for printing numerals one at a time, a totalizer having wheels, means for sensing one at a time the digits registered on said wheels, means including digital electro-magnets for causing operation of said types, electrical connections from said sensing means to said digital magnets and to said spacing magnet, the means for sensing zero being normally connected to said spacing magnet, and adapted alternately to be connected to the zero magnet, a relay controlling said alternate connections, a second relay in circuit with a return wire of the significant digit magnets, and contacts in the circuit of the first relay and controlled by the second relay to shift the zero sensing means from the space magnet to the zero magnet when any significant digit is printed.

4. In a machine of the class described, the combination of power operated types for printing the digits of a number one at a time, digital electro-magnets controlling the actuation of said types, a totalizer capable of registering positive and negative totals, means for detecting a negative total state of said totalizer, means for sensing the digital positions of the wheels of said totalizer one at a time said means including electrical contacts one for each digit, a nine complement relay controlling contact assemblies one for each digit, a ten complement relay controlling contact assemblies one for each digit, electrical connections from said digit sensing means to said digital magnets, said connections each extending from said sensing means to a contact assembly of one of said relays, thence to a contact assembly of the other of said relays and thence to one of said digital magnets, said connections when the total is positive, each extending from a sensing device to a magnet of like value, said nine complement relay changing the connection of each sensing device to its nine-complementary magnet, and said ten-complement relay causing each sensing device of value other than zero to be connected to the magnet of its ten-complementary value.

5. In a combined typewriting and computing machine, the combination of a step-by-step traveling carriage, power-operated types for printing numbers one at a time as said carriage is stepped, a totalizer having wheels, a plurality of electric circuits, means in one of said circuits for sensing the digital positions of said wheels one at a time, electro-magnets controlling the operation of said numeral types, a space magnet for spacing said carriage, electrical connections from said digit sensing means to the respective digital magnets other than zero, an electrical switch in a normal position connecting the zero sensing means with the space magnet and in another position to connect the zero sensing means with the zero magnet, a control relay in another of said circuits for operating said switch, when energized, to shift the connections from the space magnet to the zero magnet, a second relay in circuit with the digital magnets other than zero and energized therewith, contacts in circuit with the control relay and adapted to be closed when the second relay is energized to energize the control relay and cause the printing of zeros instead of spacing the carriage.

6. In a combined typewriting and computing machine, the combination of a step-by-step traveling carriage, power-operated types for printing numbers one at a time as said carriage is stepped, a totalizer having wheels, a plurality of electric circuits, means in one of said circuits for sensing the digital positions of said wheels one at a time, means in another of said circuits for sensing the decimal position, electro-magnets controlling the operation of said numeral types, a space magnet for spacing the carriage, electrical connections from said digit sensing means to the digital magnets other than zero, an electrical switch in a normal position connecting the zero sensing means with the space magnet and in another position to connect the zero sensing means with the zero magnet, a control relay in another of said circuits for operating said switch, when energized, to shift the connections from the space magnet to the zero magnet, a second relay in circuit with said decimal position sensing means, and contacts controlled by said second relay and in circuit with the control relay, said contacts, when closed, energizing the control relay to shift the connections of the zero sensing means from the space magnet to the zero magnet whereby zeros may be printed as zeros after a decimal point.

7. In a combined typewriting and computing machine, the combination of a step-by-step traveling carriage, numeral printing types, a totalizer, power operated means for actuating said types to print digits one at a time as the carriage steps, power operated means acting concomitantly with said printing means to register said digits in said totalizer, a plurality of electrical circuits, means including said totalizer for automatically controlling said printing means so as to print the total registered in said totalizer and to clear said totalizer, means for detecting a clear state of said totalizer, power operated means acting automatically at that step of the carriage following the printing of the last digit of the total for printing a clear sign under control of said detecting means, disconnecting means for disabling said registering means, a relay in one of said circuits having contacts controlling a circuit including the clear sign printing means, a second relay in another of said circuits adapted to be energized by the operation of the disconnecting means and having contacts in circuit with the first relay and opened when the second relay is energized to disable said first relay when the totalizer is clear to maintain the clear sign printing circuit open and thereby prevent the printing of a clear sign.

8. In a combined typewriting and computing machine, the combination of a traveling carriage, power operated numeral type elements, a totalizer having a plurality of wheels, all of which except the highest wheel to the left are connected to dials for registering positive and negative totals, means for sensing the digital positions of said registering wheels one at a time, said highest wheel having only an effective and a non-effective position, means for sensing the highest wheel to detect the presence of a negative total when said wheel has been moved to its effective position, means for imparting a step-by-step movement to said totalizer relative to said sensing means, the negative total detecting means being offset to the left of the digit sensing means so that the said highest wheel and the next highest wheel are sensed at the same step, electromagnets acting to cause operation of the respective numeral type elements, electrical connections from said digit sensing means to said magnets for energizing the latter selectively to print the total registered in said totalizer, means for shifting said connections under control of said negative total detecting means, and means acting when the carriage reaches the total writing column to delay the energization of the first digital magnet.

9. In a combined typewriting and computing machine, the combination of typewriting mechanism including a plurality of numeral type bars having lower case numbers of normal designs and upper case representations of the same numbers in distinctive design, a power operated case shift mechanism, computing mechanism including an adding and subtracting totalizer, means including a master wheel for entering numbers into said totalizer, means for reversing the direction of operation of said master wheel, means controlled by said totalizer for causing automatic operation of said numeral type bars to print totals registered in said totalizer to select a type bearing the value complementary to that in the totalizer when the total is negative, and to cause automatic operation of said entering means so as to clear the totalizer, means controlled by said totalizer for causing an operation of said case shift mechanism to print a negative total distinctively, means whereby said case shift mechanism normally operates said reversing means, and a case shift key acting when depressed to cause an operation of said case shift mechanism and to break the normal operative connection from the latter to said reversing means.

10. In a combined typewriting and computing machine, the combination of a step-by-step traveling carriage, numeral printing types, a totalizer, power operated means for actuating said types to print digits one at a time as the carriage steps, power operated means acting concomitantly with said printing means to register said digits in said totalizer, means including said totalizer for automatically controlling said printing means so as to print the total registered in said totalizer and to clear said totalizer, means for detecting a clear state of said totalizer, a magnet and mechanism controlled thereby to print a clear sign, an electrical connection from said detecting means to said magnet, said connection including a pair of normally open contacts, a second magnet controlling said normally open contacts and adapted when energized to close said contacts, a third magnet energized by the printing of the first significant digit, and means controlled by the third magnet to energize the second magnet when the third magnet is energized.

11. In a combined typewriting and computing machine, the combination of a step-by-step traveling carriage, power operated types for printing numbers one digit at a time as the carriage steps, an adding and subtracting totalizer for registering numbers so printed, a plurality of electric circuits, a circuit closer in one of said circuits, means on the carriage to close said closer when the carriage reaches a total writing column and while the carriage is passing through said column whereby electrical power is made available to said circuits, means in another of said circuits to sense the digital positions of said totalizer wheels one at a time, printing magnets in circuit with said sensing means and selectively controlled thereby, and acting to selectively initiate operation of said power operated types and the stepping of the carriage, a return circuit for said printing magnets, a second circuit closer in another of said circuits and similarly closed by the carriage as the carriage reaches the total column and during its passage through said column, means in still another of said circuits for sensing said totalizer to detect the presence in it of a negative total, a quick-acting relay in the last mentioned circuit and energized by said detecting means immediately the carriage reaches the highest denominational position, a shift relay in another of said circuits, said last mentioned circuit having contacts therein closed by the energization of the quick acting relay for energizing the shift relay for shifting the circuits of said digital magnets to print complements, a second quick acting relay in the return circuit of said printing magnets and energized whenever a printing magnet is energized, a slow release relay in still another of said circuits, a pair of contacts in circuit with the slow release relay and closed by the energization of said second quick acting relay to energize said slow release relay, contacts in the return circuit of said printing magnets and controlled by said slow release relay to open said return circuit and another set of contacts in circuit with the second quick acting relay and controlled by the slow release relay to be opened when said slow release relay is energized to open the circuit of said second quick acting relay, the energization of said slow release relay holding the return circuit open a predetermined time to allow for the shifting of the circuits for negative totals.

12. In a combined typewriting and computing machine, the combination of a carriage traveling step-by-step, power operated types for printing numbers one digit at a time as the carriage steps, a totalizer, a plurality of electric circuits, means in one of said circuits for sensing the digital positions of the wheels of said totalizer one at a time, type printing magnets in circuit with said sensing means, a common return circuit for said magnets, a coil of a quick-acting relay in said return circuits, a holding circuit for said quick-acting relay closed by the energization of said relay, contacts in said return circuit opened by said quick-acting relay, normally open contacts in another of said electric circuits and closed when the quick acting relay is energized, a slow release relay energized by the closing of said last named contacts, a pair of sets of normally closed contacts controlled by said slow release relay and opened when it is energized, one set of said last mentioned contacts opening the holding circuit for said quick acting relay and the other set of said last mentioned contacts being disposed in the return circuit and held open a predetermined interval of time by said slow release relay.

13. In a computing and recording apparatus, the combination of an adding and subtracting totalizer, a platen, numeral type bars for the various digit values each including upper and lower case representations of the same digit but of different designs, a plurality of printing magnets connected to and operating said type bars, a case shift mechanism for said platen to select one of said different designs, a case shift magnet connected to and operating said case shift mechanism, a device for sensing the digits of a number in the totalizer one at a time, circuits from said sensing device to said printing magnets, a nines-complement multiple contact switch in the circuits between the printing magnets and the sensing device, said switch connected to and operated by said case shift magnet, said switch in inoperated position connecting digit numbers in the totalizer with the printing magnets of the same value but, when operated by the case shift magnet, shifting said circuits to connect digit numbers in the totalizer with the printing magnets having nine-complementary values, and means for sensing the totalizer for a negative total and electrically connected to said case shift magnet to energize said case shift magnet when there is a negative total.

14. In a combined typewriting and computing machine, the combination of typewriting mechanism including type bars representing various digit numbers, each bar having distinctive upper and lower case representations of the same digit, a plurality of printing magnets connected to and operating said type bars, a case shift mechanism to select one of said distinctive designs, a case shift magnet connected to and operating said case shift mechanism, computing mechanism including an adding and subtracting totalizer, a device for sensing the digits of a number in the totalizer one at a time, circuits from said sensing device to said printing magnets, a nines-complement multiple contact switch in the circuits between the printing magnets and the sensing device, said switch connected to and operated by said case shift magnet, said switch in inoperated position connecting digit numbers in the totalizer with the printing magnet of the same value but, when operated by the case shift magnet, shifting said circuits to connect digit numbers in the totalizer with the printing magnets having nine-complementary values, means for sensing the totalizer for a negative total, a quick acting relay in circuit with said last mentioned sensing means, contacts controlled and closed by the energization of said quick acting relay, and a circuit connecting said contacts with the case shift magnet whereby when the quick acting relay is energized the nines-complement switch is operated.

15. In a combined typewriting and computing machine, the combination of a travelling carriage having columnar and letter space movements, power-operated type elements for printing values digit by digit, a totalizer having a plurality of wheels, all of which except the highest wheel to the left are adapted to register and to control printing of positive and negative totals, said highest wheel having distinct positions signifying positive totals, and negative totals, means for sensing the digital positions of said registering wheels one at a time to control said type elements, means controlled by said carriage as it reaches the total printing column for sensing the highest wheel to detect the character of the total on said totalizer, electromagnets acting to cause operation of respective numeral type elements, electrical connections from said digit sensing means to said electromagnets for energizing the latter selectively to print the total as registered in said totalizer, and means controlled by said highest wheel sensing means, when a negative total is detected on the totalizer for shifting said connections to print a negative total as a complement of the amount registered in said totalizer.

16. In a combined typewriting and computing machine, the combination of a travelling carriage having columnar and letter-space movements, power operated type elements for printing values digit by digit, a totalizer having a plurality of wheels, all of which except the highest wheel to the left are adapted to register and to control printing of positive and negative totals, said highest wheel having distinct positions signifying positive totals and negative totals, means for sensing the digital positions of said registering wheels one at a time to control said type elements, means for tabulating the carriage to a total-writing column, means made effective by such operation of the tabulating means for sensing the highest wheel to detect the character of the total on said totalizer, electro-magnets acting to cause operation of the respective numeral type elements, electrical connections from said digit sensing means to said electro-magnets for energizing the latter selectively to print the total as registered in said totalizer, and means controlled by said highest wheel sensing means, when a negative total is detected on said totalizer, for shifting said connections to print a negative total as a complement of the amount registered in said totalizer.

17. In a combined typewriting and computing machine, the combination of a set of digit types, and individual operators for said types, a letter-feed carriage cooperative therewith, means for tabulating the carriage to a total-writing column, a totalizer having wheels registering a complement total or a true total, an automatic total device operable when the carriage is moved to a total-writing column, means rendered effective by operation of the total device to cause said set of types to print a total, digit by digit, in one or the other of two ways, that is, according to the digit-representing positions of said wheels, or according to complements of said digit-representing positions, said means including two alternative operating connections to the individual operators for the types such as to be operative to cause the set of types to print said total either way, means for signifying the presence of a negative total in the totalizer, means rendered effective by the operation of said tabulating means for sensing said signifying means to detect the presence of a negative total and to predetermine through which of said connections said total is to be printed, and timing means rendered effective by the operation of said tabulating means in tabulating the carriage to the total-writing column to delay the beginning of the printing operation until said predetermining means shall have had time to operate.

18. In a combined typewriting and computing machine, the combination of a carriage travelling step by step, means for tabulating the carriage to a total-writing column, power-operated types for printing numbers one digit at a time as the carriage steps, a totalizer having an order the position of which signifies the character of the total in said totalizer, means for sensing the digital positions of the wheels of said totalizer, individual operators for said types, electrical circuits associated with said totalizer and having alternative direct and complementary connections therein, between said sensing means and said individual type operators, means made effective by said tabulating means in tabulating the carriage to the total-writing column for sensing the positions of said total-signifying order and selecting the direct or complementary operating connections through which a total will be printed, means also rendered effective by said tabulating means to open and close said circuits to said individual type operators, and a timing means rendered effective by said tabulating means, in tabulating the carriage to the total-writing column, to delay the closure of said circuits until said connections have been shifted.

19. A combined typewriting and computing machine having, in combination, a set of 0 to 9 digit types, a letter-feed carriage cooperative therewith, and individual operators for the types, means for moving the carriage to a total-writing column, a totalizer registering a complement total or a true total and including a set of digit-representing orders, and, in addition thereto, a total classifying means having alternative positions representative of the character of a total on said totalizer, an automatic total device operable when the carriage is moved to a total-writing column, means rendered effective by the operation of said total device to cause said set of types to print a total, digit by digit, in one or the other of two ways, that is, according to the digit-representing positions of said orders or according to complements of said digit-representing positions, said means having alternative direct and complemental operating connections between the totalizer orders and the individual operators for the types so as to be operative to cause the set of 0 to 9 types to print said total either way, and further comprising means rendered effective by the operation of said moving means, in moving the carriage to the total-writing column, for sensing the position of said total classifying means and for selecting the direct or complemental operating connections through which the total will be printed.

EDWIN O. ROGGENSTEIN.